United States Patent [19]

Fleischer

[11] 4,181,356

[45] Jan. 1, 1980

[54] FOLDING BABY CARRIERS

[76] Inventor: Henry Fleischer, 18 Notch Park Rd., Little Falls, N.J. 07424

[21] Appl. No.: 759,066

[22] Filed: Jan. 13, 1977

[51] Int. Cl.² ............................................. A47C 1/14
[52] U.S. Cl. .................................. 297/350; 297/377; 272/85; 272/86; 248/370; 5/417
[58] Field of Search ...................... 272/85, 86, 87, 88, 272/89, 90, 91, 92; 280/47.37 R, 47.38; 297/92, 93, 14, 51, 118, 183, 350, 16, 315, 254, 255, 256, 257; 296/28 B; 52/578, 580, 581, 582, 586; 5/344

[56] References Cited

U.S. PATENT DOCUMENTS

| | | | |
|---|---|---|---|
| 272,273 | 2/1883 | Leavitt, Jr. | 297/377 |
| 412,400 | 10/1889 | Milliken | 297/44 |
| 694,163 | 2/1902 | Coursier et al. | 297/44 |
| 1,098,072 | 5/1914 | Zagar | 297/44 |
| 1,625,106 | 4/1927 | Sullivan | 297/351 |
| 1,721,366 | 7/1929 | Backstrom | 297/350 |
| 1,930,942 | 10/1933 | Pringle | 5/344 |
| 1,963,835 | 6/1934 | Deland | 297/44 |
| 2,001,252 | 5/1935 | Johnson | 297/350 |
| 2,045,784 | 6/1936 | Leve | 5/344 |
| 2,108,531 | 2/1938 | Flanders | 297/350 |
| 2,158,247 | 5/1939 | Newport | 297/350 |
| 2,368,498 | 6/1945 | Sturgeon | 297/377 |
| 2,471,462 | 5/1949 | Toth | 217/14 |
| 2,710,646 | 6/1955 | Kirby | 297/350 |
| 2,760,557 | 8/1956 | Merriman | 297/377 |
| 2,898,609 | 8/1959 | Storie | 5/344 |
| 3,189,382 | 6/1965 | Fortier | 297/351 |

FOREIGN PATENT DOCUMENTS

| | | | |
|---|---|---|---|
| 1666873 | 6/1954 | France | 297/377 |
| 459000 | 12/1976 | United Kingdom | 297/351 |

Primary Examiner—Richard C. Pinkham
Assistant Examiner—T. Brown

[57] ABSTRACT

Collapsible baby carriers are provided which may be employed by themselves as car beds, car seats, or infant seats or in conjunction with collapsible frames to provide strollers, carriages, high chairs, bathinettes and the like. One embodiment of the collapsible carrier involves a two-piece telescoping carrier provided with a series of hinges, which requires no locks or fasteners; the two-piece carrier remains open as long as an infant is positioned therein and when desired, is easily collapsed. Two and three-way carriers are also provided which include a head portion, body portion and foot portion. The positions of the head portion and the foot portion may be adjusted independently of each other. Alternatively, movement and positioning of one of the head and foot portions may cause corresponding movement and positioning in the other.

In addition, a unique semi-circular track arrangement is provided for use in conjunction with carrier-frame combinations or swing sets which permits a carrier to be deployed and secured in any desired disposition with regard to the frame.

18 Claims, 64 Drawing Figures

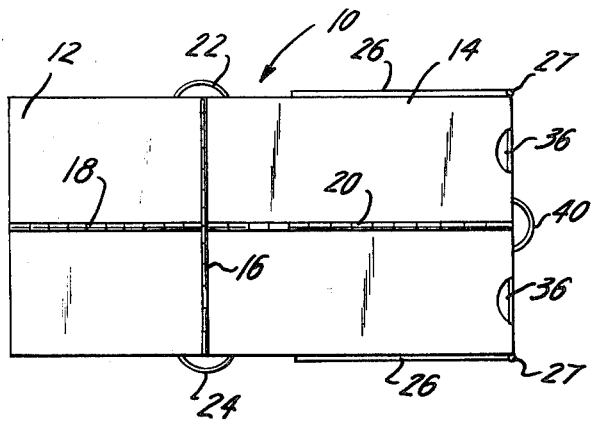
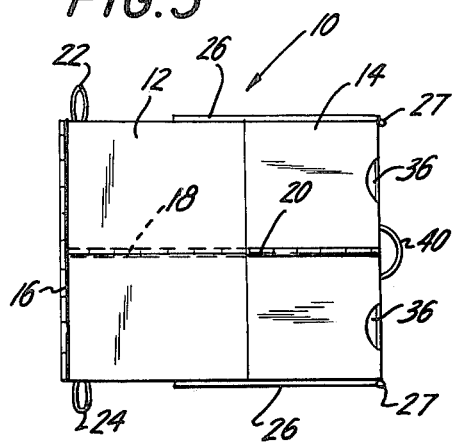
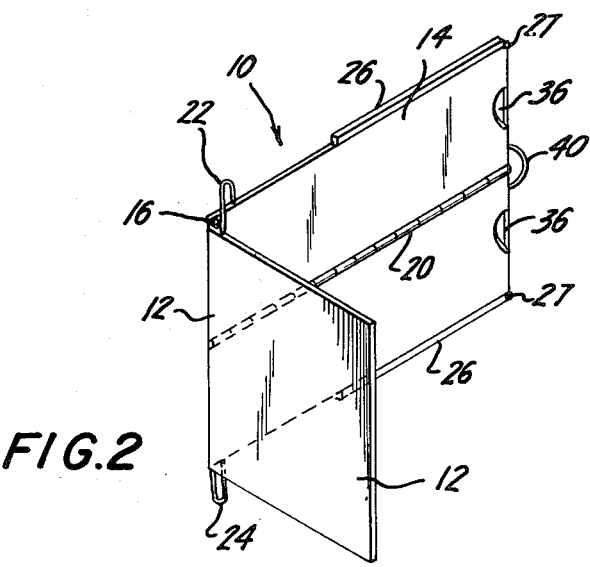
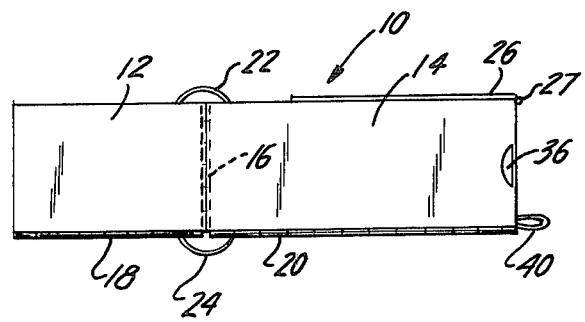
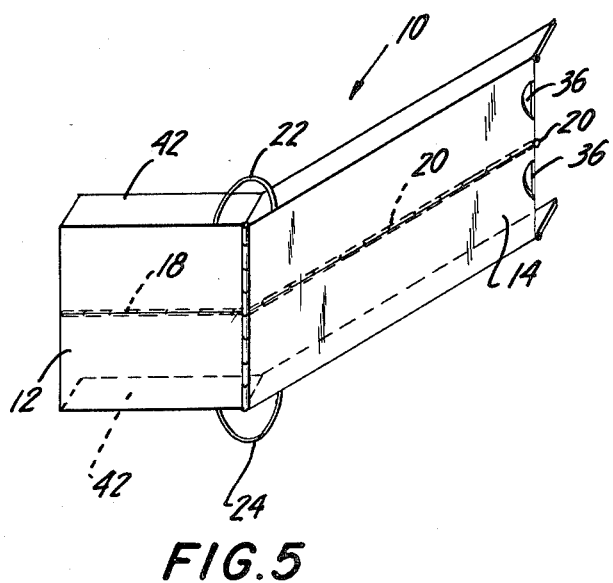
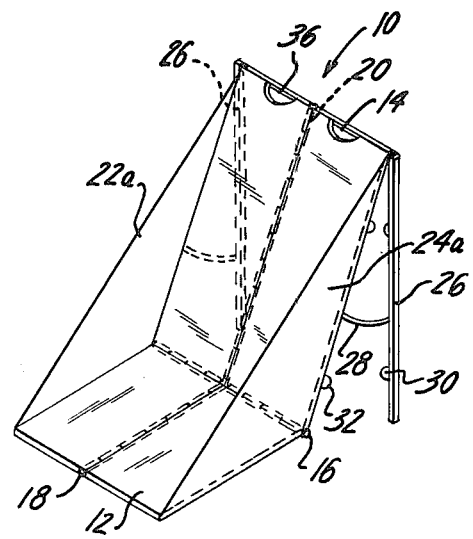

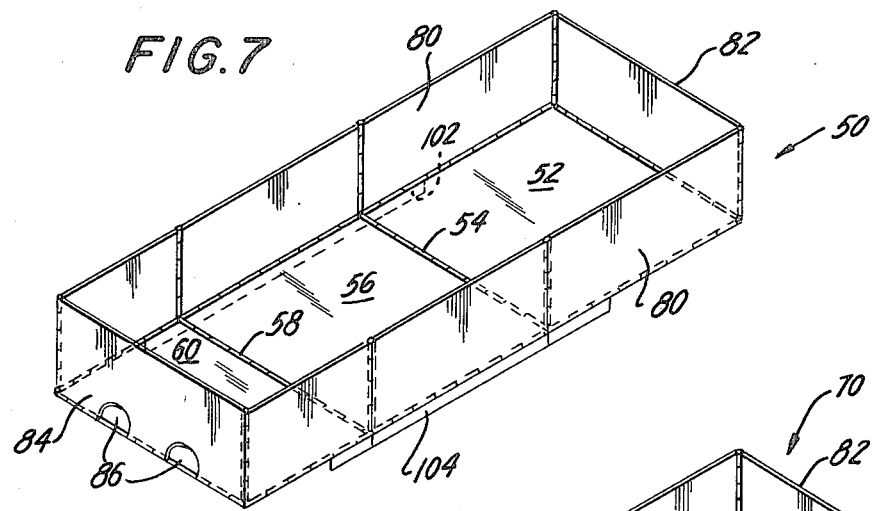
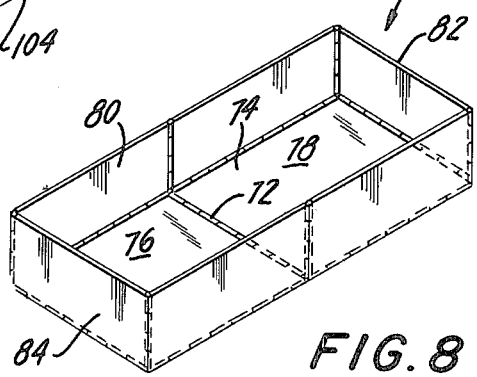
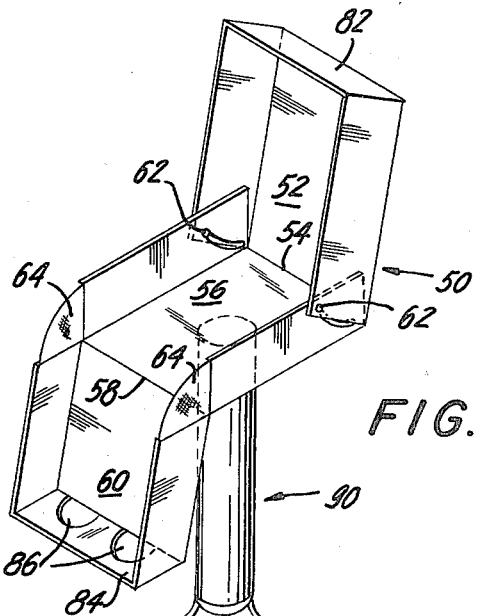
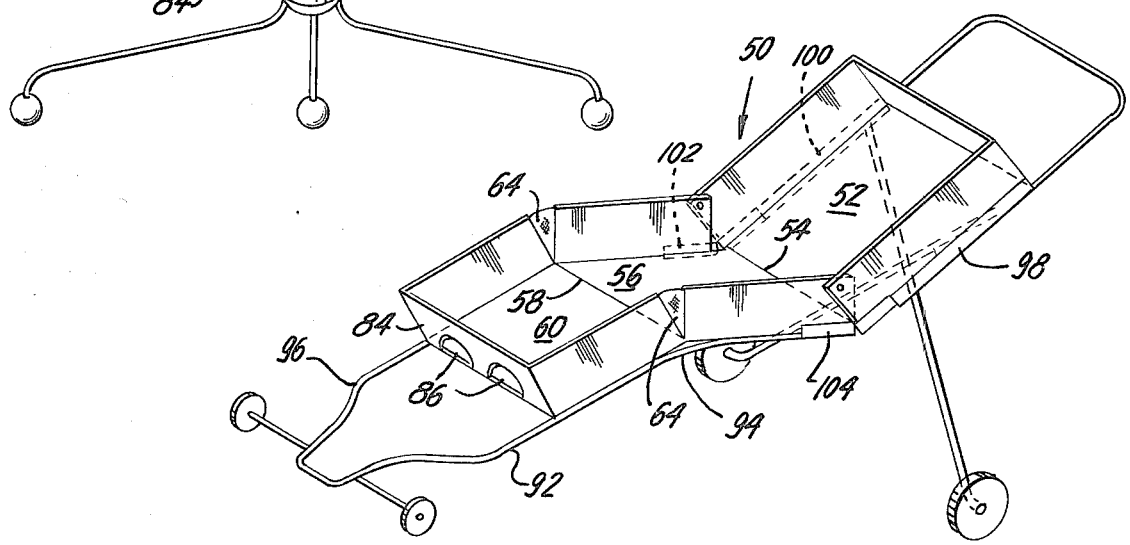

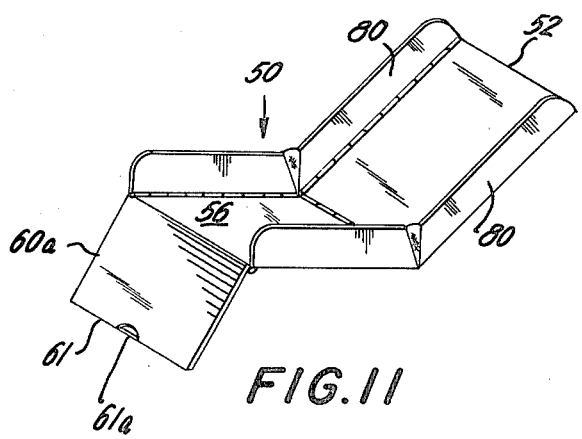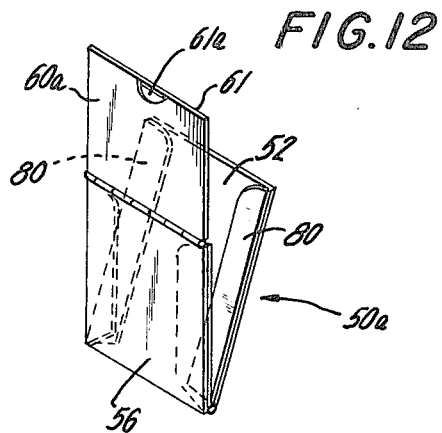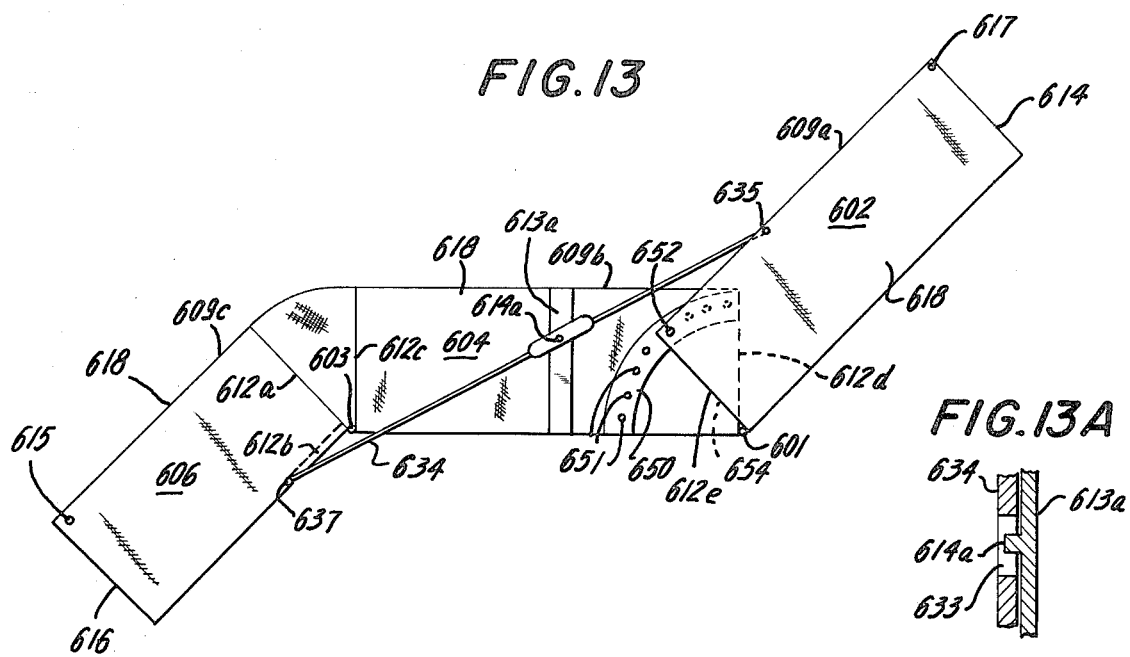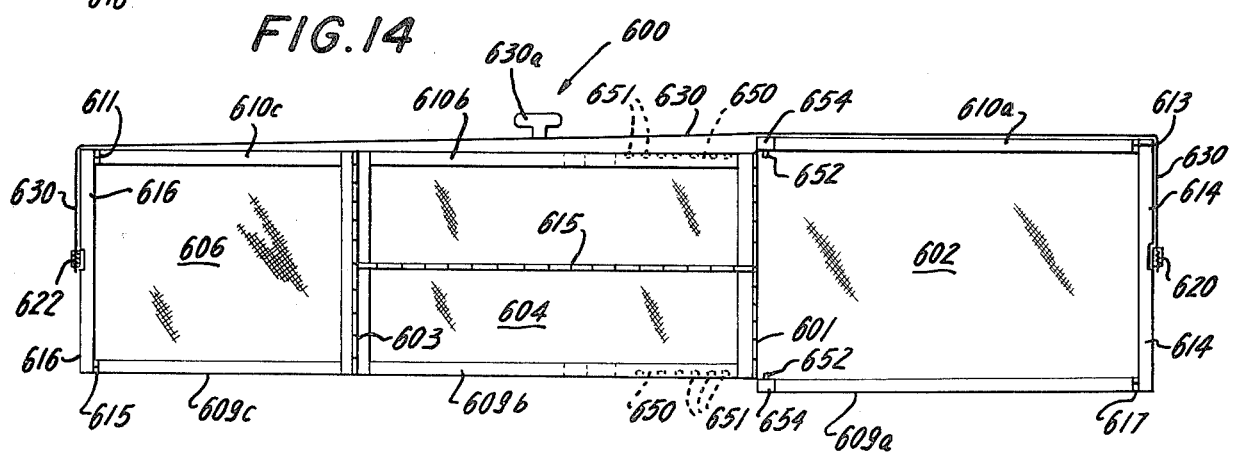

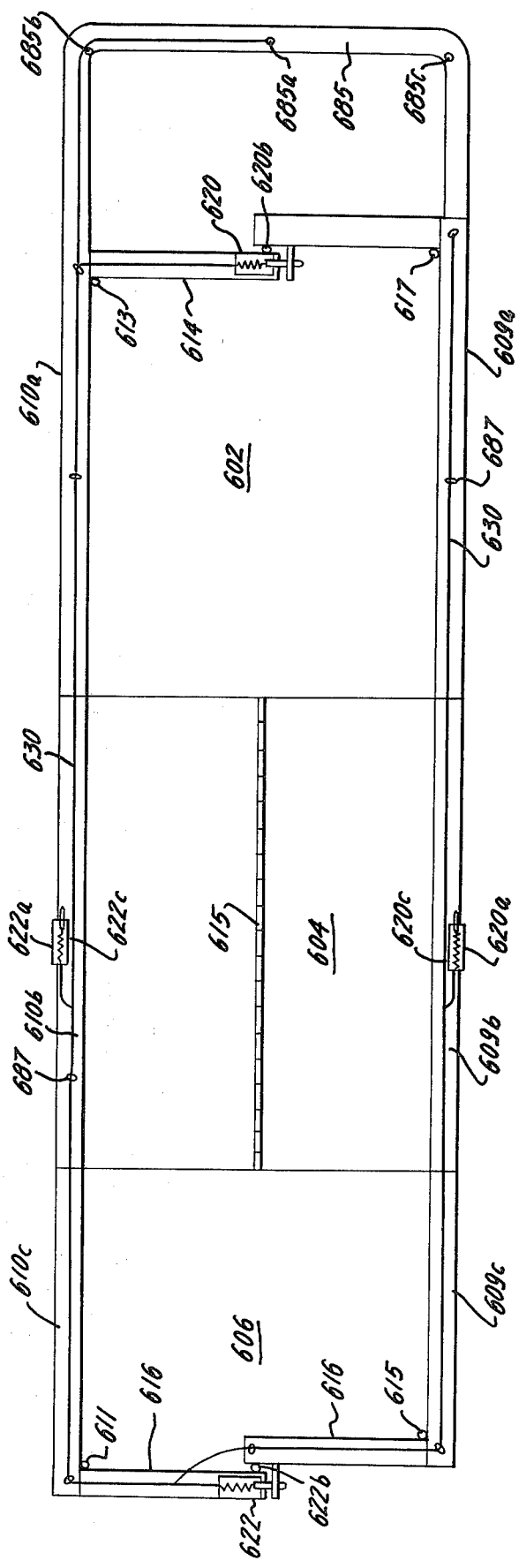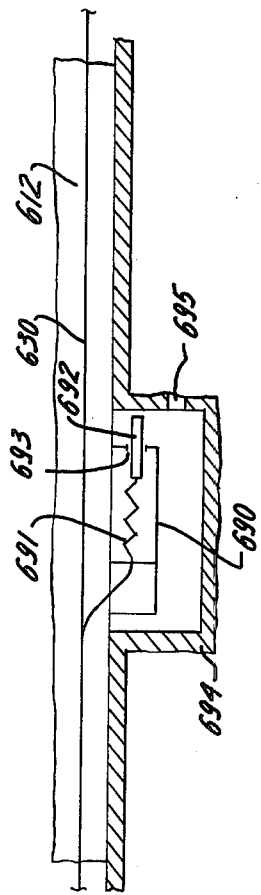

FIG.21
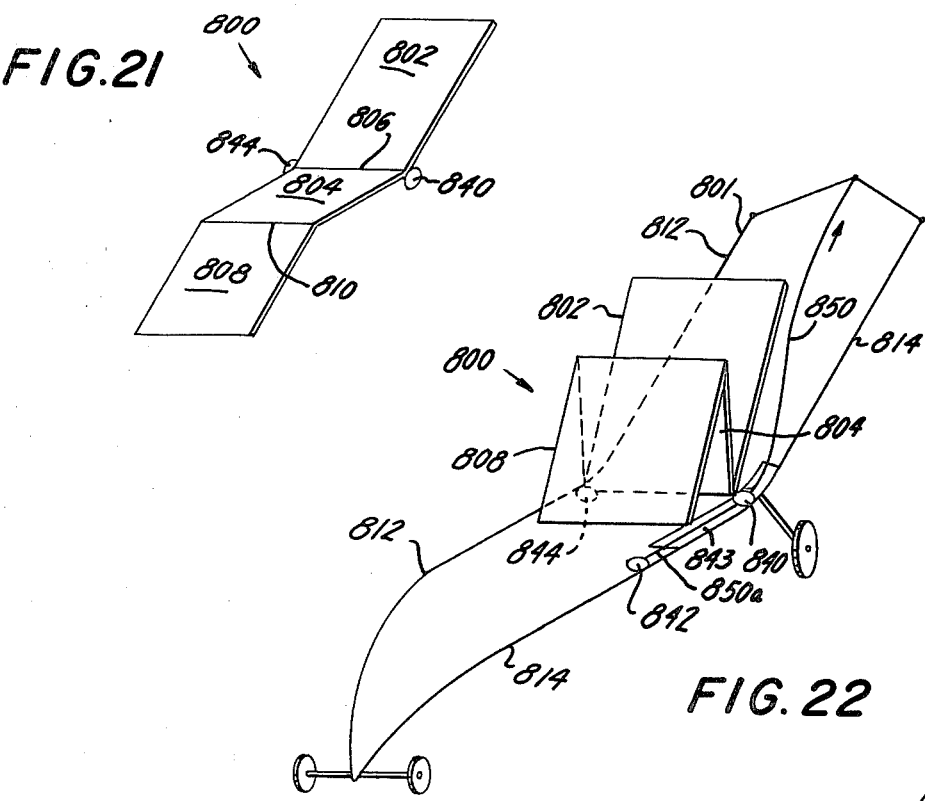
FIG.22
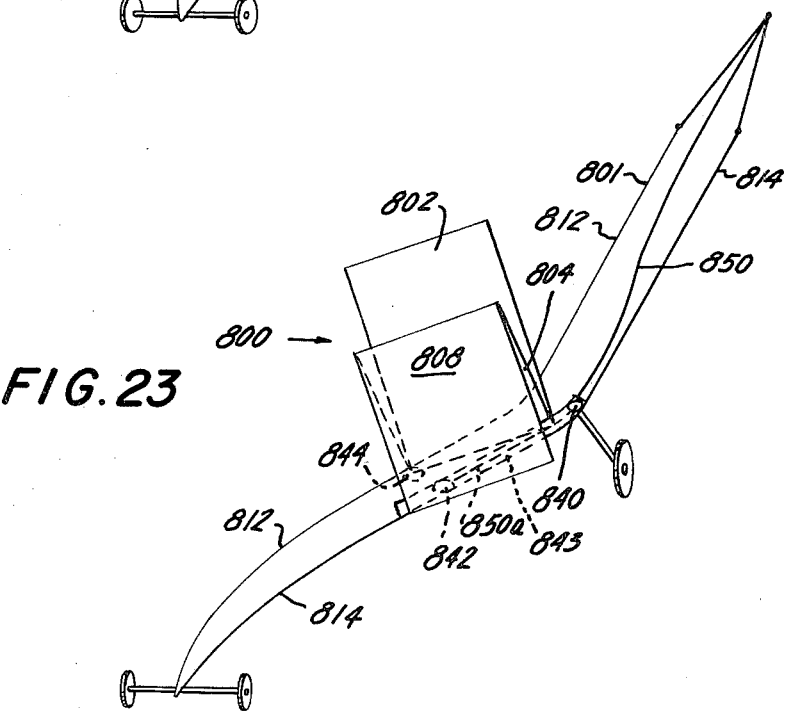
FIG.23

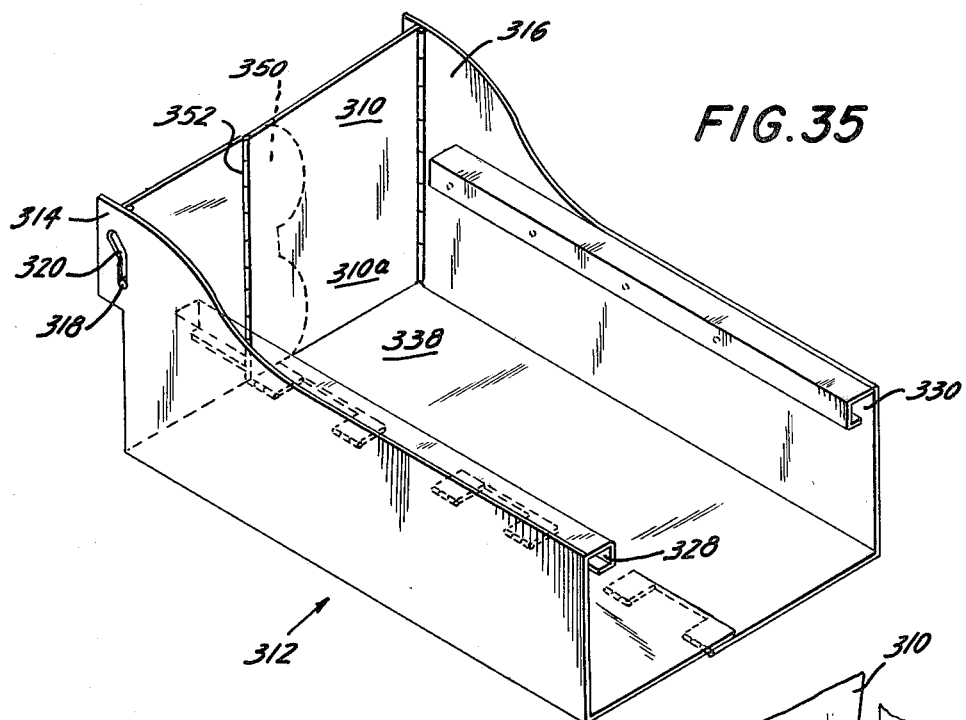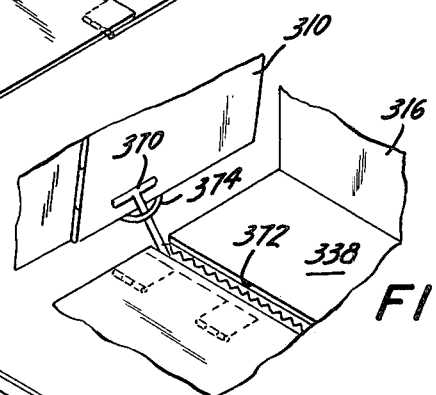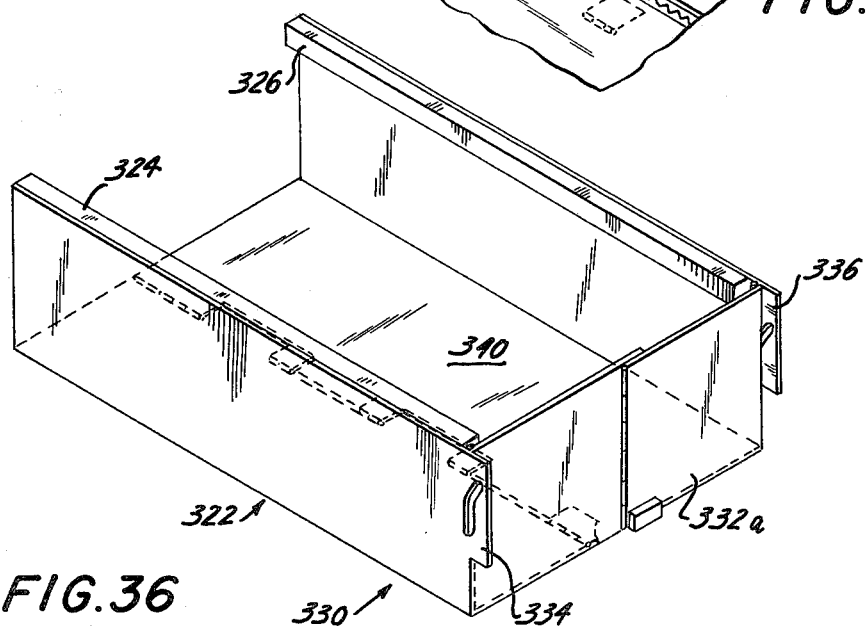

FIG. 37
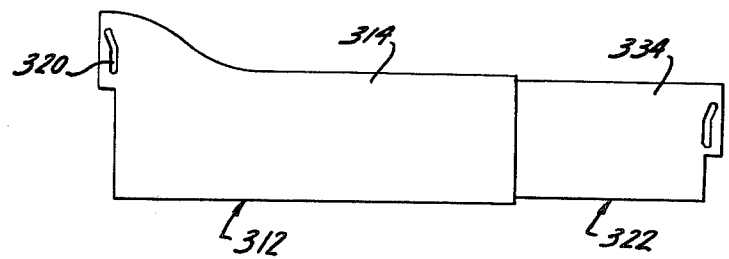
FIG. 38
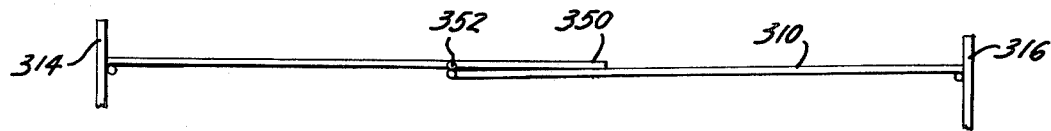
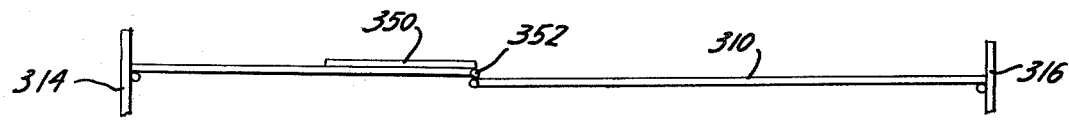
FIG. 39
FIG. 40
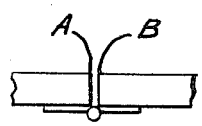

FIG. 44
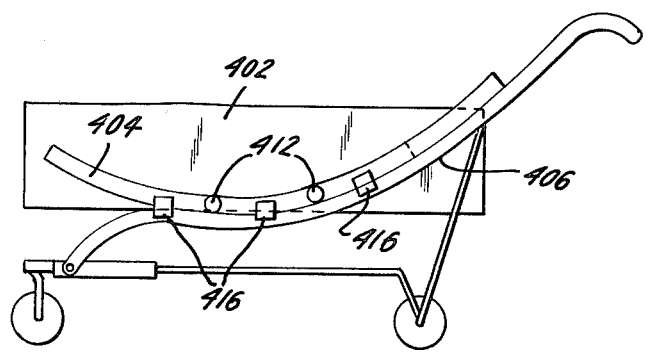
FIG. 45
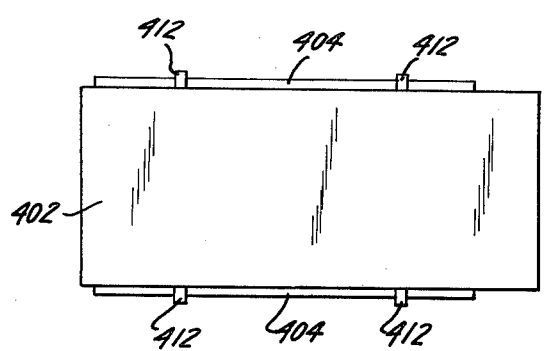
FIG. 46
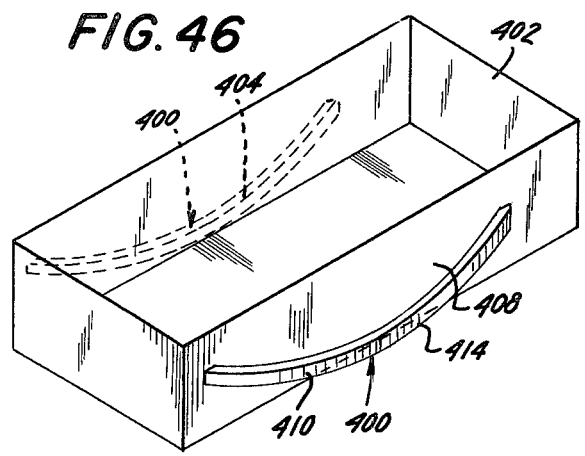
FIG. 47
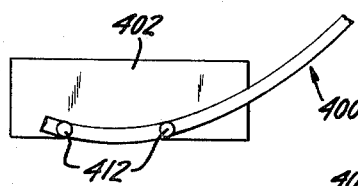
FIG. 50A
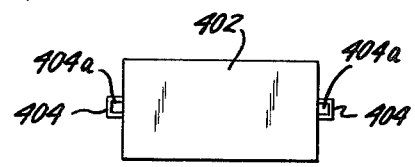
FIG. 48
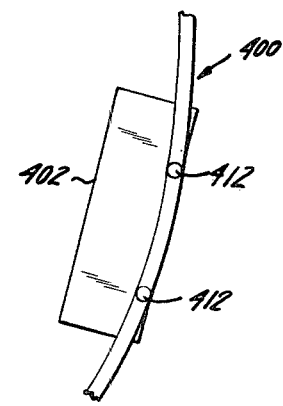
FIG. 49    FIG. 50
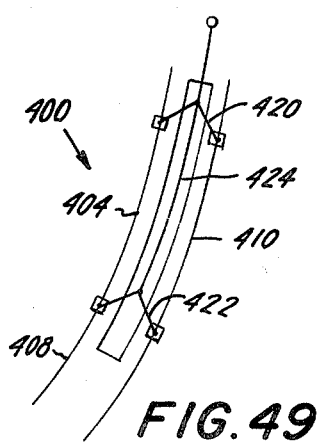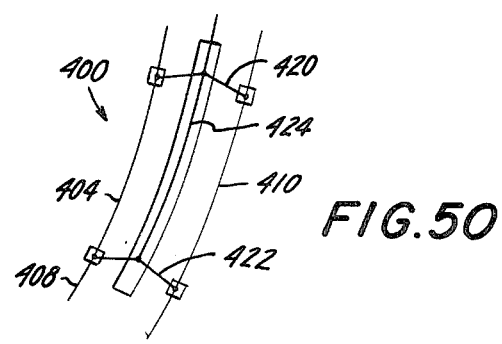

FOLDING BABY CARRIERS

FIELD OF THE INVENTION

The present invention relates to collapsible carriers for infants and children which are capable of being employed by themselves or in conjunction with collapsible frames to provide a system capable of functioning as a car bed, car seat, infant seat, stroller, carriage, high chair and the like.

BACKGROUND OF THE INVENTION

The choice in child carrying and securing devices existing in the marketplace today is endless. There are many different types of devices serving the same or different functions. Thus, the prospective buyer asks not only what brand of device to buy but whether car beds, car seats, infant seats, youth seats, high chairs, bathinettes, carriages, strollers, walkers, etc. are all actually necessary. Of course, each of these devices plays an important function at one time or another. But where are all these devices to be installed? How is one able to pay for all of them? Unfortunately, until now, the new parent had no real answers to these questions. These items are necessities so that the parent was required to purchase each device and somehow make the necessary storage room therefor.

The present invention provides a real solution to the problem of providing each of the child holding, carrying and supporting functions discussed above in a manner so as to require a minimum of expense and storage capacity.

BRIEF DESCRIPTION OF INVENTION

In accordance with the present invention, there is provided a collapsible carrier for infants which includes a seat portion, a back rest portion, a transversely disposed hinge for hingedly connecting the seat and back rest portion to each other, and optionally at least one longitudinally disposed hinge disposed intermediate sides of and running the length of the seat portion and back rest portion, thereby dividing the seat portion and back rest portion into two longitudinal sections. The carrier may be collapsed by moving the seat portion about the transversely disposed hinge in close proximity to the back rest portion, and moving one of the longitudinal sections about the longitudinally disposed hinge into close proximity to the other of said longitudinal sections.

The carrier may also include a detachable foot rest portion hingedly connected to the front end of the seat portion.

The carrier may be formed of a rigid material so that it is capable of supporting its own weight.

Alternatively, the carrier may be formed of a flexible material and, in such case, will further include a carrier support frame disposed about and removably connected to the sides and ends of the seat portion and the back rest portion.

The carrier as described above may be attached to a frame, such as a stroller, carriage and/or high chair frame. In such case, the carrier will include frame attaching means comprising grooves, rods or rails adapted to engage corresponding members of a frame.

In another embodiment of the present invention, the back rest portion of the carrier will further include back side and end bar supports disposed about the sides and ends of the back rest portion, the back side and end bar supports being pivotally connected to each other, and the seat portion will include seat side and end bar supports disposed about the sides and ends of the seat portion, the seat side and end bar supports being pivotally connected to each other. In such case, the back rest portion and seat portion may be formed of flexible material, the flexible material of the back rest portion and the flexible material of the seat portion being suspended from their respective bar supports.

The carrier of the invention may also include semi-circular arc means having at least two positioning means disposed therein, the semi-circular arc means being connected to a rear side portion of the seat portion, and the back rest portion includes means for engaging the semi-circular arc at a desired position along same to lock the back rest portion at a desired angle to the seat portion.

A foot rest portion may be hingedly and removably connected to the seat portion, the foot rest portion including foot side and end bar supports, corner bar supports, and optionally at least one bar support connected to a lower corner thereof and running at least partially down the underside surface of said foot portion.

In one of the preferred embodiments of the invention, control bar means are connected to the back rest portion and the foot portion whereby when the back rest portion is pivoted about the transverse hinge connecting the back rest portion and the seat portion, corresponding movement will be imparted to the foot portion. In addition, strut means may be employed to pivotally connect the control bar means to a seat side bar support, for supporting and providing a pivot point for the control bar means.

Still another collapsible baby carrier, in accordance with the present invention, is provided which includes a bottom wall, a centrally disposed longitudinal hinge running the length of the bottom wall, a pair of spaced apart side walls, each hingedly connected to the bottom wall via longitudinally disposed hinges, and at least one end wall hingedly connected to the bottom wall via a transversely disposed hinge and connected to the side walls, the end wall including a vertically disposed hinge spaced by the ends thereof. The carrier may be collapsed by collapsing the centrally disposed hinge inwardly or outwardly and collapsing the vertical hinge in the end wall inwardly or outwardly, thereby causing the bottom wall to fold inwardly or outwardly, the end wall to fold inwardly or outwardly and the side walls to move inwardly toward each other.

Further in accordance with the present invention, a two piece telescoping baby carrier is provided which includes a head section and a foot section adapted to be in telescoping engagement with each other, each of the head section and foot section including a bottom wall, a pair of side walls connected to the bottom wall, and an end wall panel connected to the bottom wall, such end panel including securing means for securing ends of the end panel to each of its corresponding side walls. The end panel may thus be disengaged from the side walls and pivoted downwardly when not needed or for collapsing.

In one embodiment of the last mentioned carrier, the securing means comprises a pin disposed along the edges of either side of the end panel adapted to engage in corresponding slots in the said walls. In addition, the carrier may further include a longitudinally centrally disposed hinge in the bottom wall of each of the head and foot sections adapted to be folded inwardly or outwardly for collapsing, and optionally further include vertically disposed hinges disposed in the end wall panels of each of the head and foot sections, such hinges being adapted to be folded inwardly or outwardly.

In a preferred embodiment of the above carrier, there is further included a hinge flap connected to at least one of the vertically disposed hinges in the end panels, the hinge flap being pivotally connected to a portion of the hinge so that when the hinge flap is disposed as an extension of a first section of the end panel defined by the vertically disposed hinge so as to overlap the second section of the end panel, the hinge flap prevents the end panel from buckling and when the hinge flap is pivoted back on to the first section, the end panel is free to pivot via vertical hinge inwardly or outwardly. A similar hinge flap may be disposed in conjunction with the centrally disposed hinge to prevent undesired buckling thereof.

In addition, in accordance with the present invention, a three piece carrier is provided which includes a head part, a body part pivotally and removably connected to the head part, and a foot part removably connected to the head part, the head part including at least one extension arm (and preferably two) one end of which is pivotally connected to the head part, the other end including foot part engaging means, and the foot part includes means for receiving the engaging means so as to connect up the foot part to the head part. The foot part may be disengaged from the head part, and the head part and body part employed as a two-way carrier.

The foot part engaging means may comprise one or a pair of hooked portions and adapted to be received in corresponding slots in the foot portion to engage said foot and head parts.

The head part is pivotally connected to the body part and the body part is pivotally connected via the extension arm to the foot part so as to provide movement of the head, body or foot parts with respect to each other.

In another aspect of the present invention, a semi-circular arc-like track arrangement for securing a carrier to a support frame is provided, which includes an arc-like elongated member adapted to be connected to a side of the carrier or to the frame, the arc-like elongated member including securing means for securing the carrier at least two different positions at different angles or positions on the frame, the carrier or frame including engaging means for engaging the securing means of the arc-like elongated member at one or more of the positions.

The track arrangement may be connected to a carrier and thus may include a pair of arc-like elongated members attached at opposite sides of the carrier; the frame will include pin means for securing the frame to each of the arc-like members.

The pair of semi-circular arc-like track arrangements, as described above, may also be attached to either side of a swing carrier supported by a support frame. Swing support means such as chains or ropes are attached to the track arrangements for connecting the carrier to the frame. The carrier may be positioned with respect to the frame, via the track arrangements, to swing back and forth or side or side. Furthermore, the swing support means may be connected to swivel means to allow the carrier to be rotated.

BRIEF DESCRIPTION OF THE ACCOMPANYING FIGURES AND PREFERRED EMBODIMENTS OF THE INVENTION

FIG. 1 is a schematic plan view of one embodiment of a two-way baby carrier in accordance with the present invention in an open position for use as a bed or the like with a collapsible frame;

FIG. 2 is schematic perspective view of the carrier shown in FIG. 1 partially collapsed or in folded position;

FIG. 3 is a plan view of the carrier shown in FIG. 1 in a partially folded position;

FIG. 4 is a plan view of the carrier of FIG. 1 in a completely folded position;

FIG. 5 is a view of the carrier of FIG. 1 in a disposition suitable for use in an automobile;

FIG. 6 is a schematic perspective view of the carrier of FIG. 1 deployed as an infant seat;

FIG. 7 is a schematic perspective view of a three-way carrier in accordance with the invention deployed as an infant bed;

FIG. 8 is a schematic perspective view of a two-way carrier in accordance with the invention;

FIG. 9 is a schematic view of the three-way carrier of FIG. 1 deployed on a support frame as an infant seat or high chair;

FIG. 10 is schematic view of the three-way carrier of FIG. 7 deployed on a stroller frame;

FIG. 11 is a schematic view of another embodiment of a three-way carrier in accordance with the present invention;

FIG. 12 is a schematic view of the carrier shown in FIG. 11 in a partially collapsed position;

FIG. 13 is a schematic side view of another embodiment of a three-way carrier in accordance with the present invention in a working position as an infant seat for the home or car;

FIG. 13A is a fragmentary end view of a portion of the carrier shown in FIG. 13;

FIG. 14 is a plan view of the three-carrier shown in FIG. 13;

FIG. 14A is a schematic plan view of an alternative embodiment of a carrier similar to that shown in FIG. 14, in accordance with the present invention;

FIG. 14B is an enlarged view of the locking mechanism employed in the carrier of FIG. 14A;

FIG. 21 is a schematic view of the three-way carrier-frame combination of FIG. 19 in a partially collapsed state;

FIG. 22 is a schematic view of the three-way carrier-frame combination of FIG. 19 in a collapsed state;

FIG. 23 is a schematic view of the three-way carrier of FIGS. 19–20 in a longitudinally collapsed position;

FIG. 35 is a perspective view of the head portion of a two-piece telescoping carrier in accordance with the present invention;

FIG. 36 is a perspective view of the leg or foot portion of the two-piece telescoping carrier in accordance with the present invention employed in conjunction with the head portion shown in FIG. 35;

FIG. 37 is a side view of the head portion of FIG. 35 and the foot portion of FIG. 36 in telescoping relation;

FIG. 38 is a plan view of the front wall of the head portion shown in FIGS. 35 and 37 in its normal open position;

FIG. 39 is a plan view of the front wall of the head portion shown in FIGS. 35, 37 and 38 in a disposition ready for collapsing;

FIG. 40 is a plan view of an alternate means in lieu of flaps for keeping the carrier of FIG. 35 in an open working position;

FIG. 41 is a view of a portion of the carrier portion shown in FIG. 35;

FIG. 44 is a side schematic view of a carrier-frame combination employing the unique semi-circular track arrangement of the invention for positioning the carrier on the frame;

FIG. 45 is a plan view of the arrangement shown in FIG. 44;

FIG. 46 is a schematic perspective view of the carrier shown in FIG. 44 having the semi-circular track arrangement secured thereto;

FIGS. 47 and 48 are side views of the carrier shown in FIGS. 44 to 46 secured to the semi-circular track arrangement along different positions thereof;

FIGS. 49 and 50 are schematic views of the semi-circular track arrangement employed in conjunction with the carrier-frame combination of FIGS. 44 to 48;

FIG. 50A is an end view of an alternate semi-circular track arrangement in accordance with the present invention;

DETAILED DESCRIPTION OF THE ACCOMPANYING FIGURES

Figure 13B:
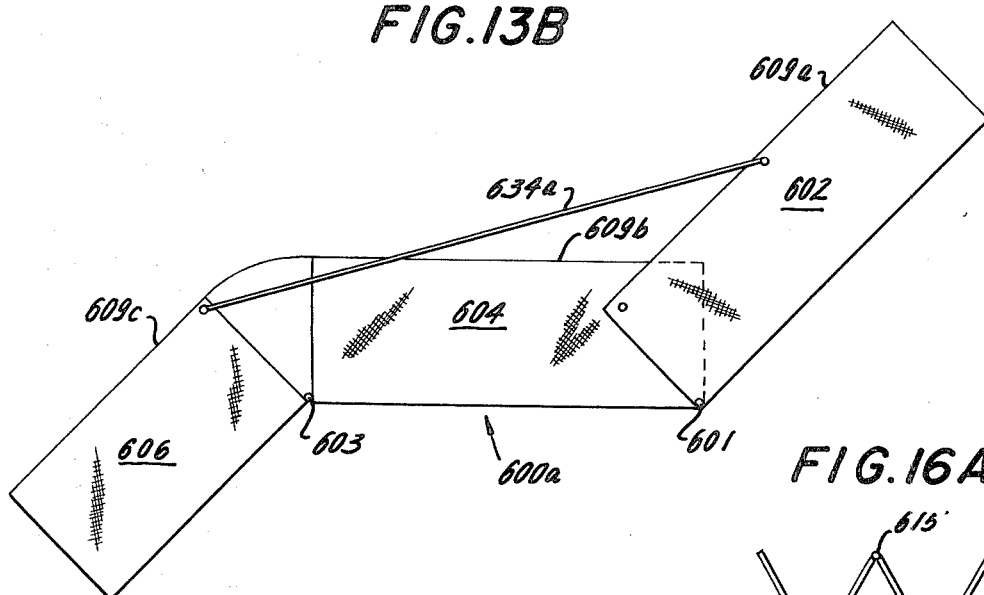
FIG. 13B is a schematic side view of another embodiment of a three-way carrier in accordance with the present invention.

Referring now to the accompanying Figures wherein like parts are represented by like numerals in the several views there is shown in FIGS. 1 to 6 a two-way carrier for infants indentified generally by the numeral 10 and designed for compactness, lightness and ease of collapsing for storage. The carrier 10 may be employed in conjunction with conventional frames to form a stroller, high chair, carriage and the like or by itself as a car seat or infant seat as will be described hereinafter. The carrier 10 includes two portions 12, 14 which are hingedly connected to each other via hinge 16. The portion 12 also includes hinge 18 and portion 14 includes hinge 20 to facilitate easy collapsing as will be described hereinafter. Portion 12 may also be secured to portion 14 via adjustable belts or strap supports 22, 24 which also are employed as braces to keep portions 12, 14 at any desired angle to one another as well as relieving the load on the hinge 16. As shown in FIG. 6, the carrier 10 may be employed by itself (without a frame) as an infant seat in which case the support straps are adjusted so that they connect and secure the bench portion 12 to the upper area of back rest portion 14 as shown. The bench and back rest portions 12, 14, respectively, will include conventional means (such as loops), for holding and locking the support and protective side flaps or straps 22a, 24a thereto. In order to support the carrier 10, legs or back brace 26 are pivotally connected via hinge or pivot 27 to the upper portion of the back rest portion 14 as shown and may be connected via adjustable straps 28 to back rest portion 14 as well. The back brace 26 may be locked into the position shown in FIG. 6 or other desired positions employing a conventional hinge-lock arrangement.

Where it is desired to employ the carrier 10 on a chair or automobile seat, the back brace or legs 26 may simply be pivoted inwardly against the back rest portion 14 and clamped thereto via clamping means 30, 32 as shown at the position shown in FIG. 5.

It will be appreciated that the infant seat 10 may be secured to a chair or other support by draping the back brace or legs 26 over the back of the chair and then moving the back brace 26 inwardly against the chair back and locking the hinge-pivot 27 and tightening the straps 28 about the chair.

The carrier 10 may be disposed flat as an infant bed, crib, cradle or even car bed as shown in FIG. 1 by adjusting the straps 22, 24 accordingly and rotating the portion 12 downwardly to the position shown in FIG. 1.

The carrier 10 may be formed of plastic (hard or soft), wood, canvas (with appropriate framing), metal and the like and will, of course, if desired, be equipped with padding or cushioning.

Where it is desired to collapse the carrier 10 for storage, the portion 12 is simply rotated upwardly toward the portion 14 as shown in FIG. 2 until both portions make contact as shown in FIG. 3. The carrier may then be folded about hinges 18, 20 to the position shown in FIG. 4 and when stored will occupy a minimum of space.

The portion 14 may include cutouts 36 or other gripping means for carrying the carrier 10 about. If desired, adjustable carrying strap 40 may be connected to the carrier 10 as shown in FIGS. 3 and 4 to facilitate carrying of same. In addition, the carrier 10 may include collapsible side supports 42 shown in FIG. 5 (hingedly connected to or near the long side edges of the portions 12, 14) to serve as restraining devices as well as for support and comfort. A foot rest may be provided at the end of portion 12, as well.

Turning now to FIGS. 7, 9 and 10 there is shown a three-way carrier in accordance with the present invention and identified generally by the numeral 50. The carrier 50 may be used in conjunction with a frame for a stroller, carriage, and the like including those disclosed in U.S. Pat. Nos. 3,967,833, 3,961,803 and 3,971,079 as well as with any other type of frames and/or bases. The three-way carrier 50 includes head-back portion 52, hingedly connected via hinge 54 to seat portion 56, seat portion 56 being hingedly connected via hinge 58 to leg portion 60, as shown. As shown in FIG. 9 the hinge 54 can fold so that section 52 of the carrier moves upwardly and functions as a back rest, while hinge 58 can fold downwardly so that the section 60 moves downwardly and functions as a leg rest, while section 56 functions as a seat. The ends of the sides of section 52 can be locked to the sides of section 56 at 62, while flaps 64 connect the ends of the sides of section 56 to the ends of the sides of section 60 as shown in FIG. 9. In fact, either of sections 52 and 60 can be adjusted from the horizontal to vertical positions or any position inbetween by using locks and flaps as shown in FIG. 9.

In FIG. 8 a two-way carrier 70 is shown which includes a single hinge 72 along the bottom wall 74 thereof so that either section 76 and 78 can be folded up or down or to any position inbetween.

Each of the embodiments of FIGS. 8 and 9 include hingedly connected side portions 80 and hingedly connected end portions 82, 84 which may be folded out of the way upon collapsing of the carriers. End 84 may also include leg or foot openings to be used where a child's legs extend beyond the end 84. Alternatively, if desired, the end 84 may be pivoted downwardly and out of the way to make room for the legs and feet of a child.

In FIG. 9, the three-way carrier 50 is mounted on a base 90 (employing conventional mounting means) so that it may be employed as a high chair or even as a stroller, crib, cradle or the like depending upon the position of the various sections 52, 56 and 60 of the carrier.

FIG. 10 illustrates the carrier 50 removably secured to a frame 92 which includes support members 94, 96 carrying tracks, slide rods or grooves 98, 100, respectively, thereon. The carrier 50 may include grooves, rods or rails 102, 104 (shown in FIG. 7) which are adapted to engage the tracks, slide rods 94, 96, respectively, of the frame 92 in a manner so as to be positioned in any position along the frame 92. Once positioned on the frame 92, the carrier 50 can be moved along the tracks, slide rods or grooves 98, 100 to any other desired position. The carrier 50 may be locked along the tracks, slide rods or grooves 98, 100 with appropriate pins or locks and may be completely removed therefrom by releasing the locking mechanism.

It will also be appreciated that a single track, slide rod, or rail may be connected down the center of frame 92 and is adapted to engage a single corresponding member on the carrier 50.

In the case of all of the carriers described herein, the seat portion, back rest portion, and even the leg rest portion (where present) may be designed in a slightly concave manner (regardless of the materials of construction whether they be rigid or fabric like) to provide additional comfort to the child.

FIGS. 11 and 12 illustrate a three-way carrier 50a similar to that described above. In the carrier 50a, the leg section 60a does not include any sides or end portion (which are present in carrier 50) but includes gripping means 61 (for ease of carrying in the collapsed state shown in FIG. 12) which may take the form of a series of openings 61a as shown. If desired, a carrying handle or carrying strap may be employed in place of the openings. In addition FIGS. 11 and 12 show the sides 80 of the carrier 50a in a collapsed position. As can be seen from FIG. 12, the carrier 50a is readily collapsed into a small package occupying little storage space. As in the case of the normal open working positions, the carrier may be locked in the closed position to facilitate portability.

Figure 16A:
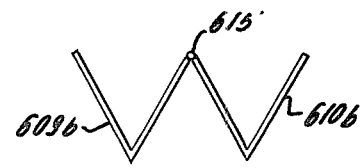
FIG. 16A is a cross-sectional view taken along lines 16A—16A of FIG. 16.
Figure 15:
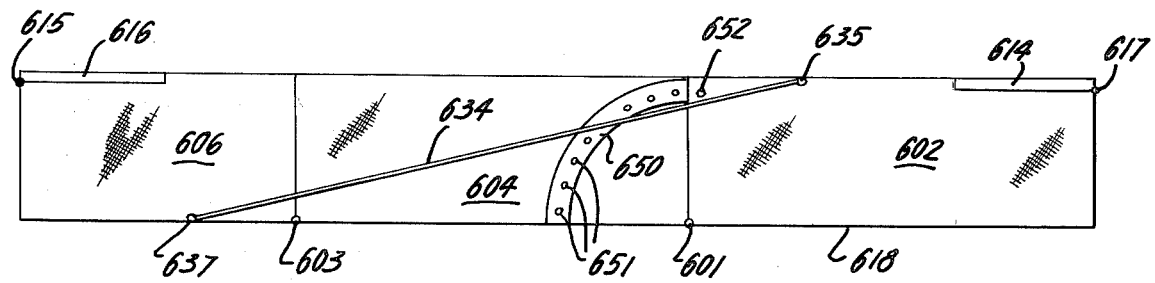
FIG. 15 is a side view of the three-way carrier of FIG. 13 in a collapsed state.
Figure 16:
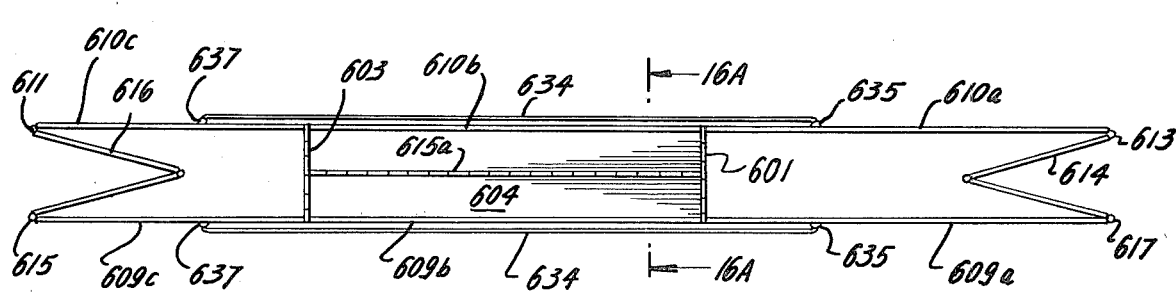
FIG. 16 is a plan view of the three-way carrier of FIG. 13 in a collapsed state.

Turning now to FIGS. 13 to 16 there is shown a three-way carrier 600 which includes a head portion 602, body portion 604 and foot portion 606, the head portion 602 being hingedly connected to body portion 604 via pivot 601 and body portion 604 is hingedly connected to foot portion 606 via pivot 603. The carrier 600 includes bar supports 609a, 609b, 609c, 610a, 610b, 610c, 614 and 616 pivotally connected to each other via pivots 611, 613, 615 and 617 and disposed about the four sides thereof as well as bar supports 612a, 612b on foot portion 606, bar supports 612c and 612d on body portion 604, and bar support 612e and head portion 602 (as best seen in the top view of FIG. 14). A soft carrier portion 618 is suspended from and hangs between the bar supports 609a, 609b, 609c, 610a, 610b, 610c, 614 and 616. Bars 614 and 616 include locks or pivots 620, 622, respectively, as shown in FIG. 14, which locks or pivots may be connected to cable 630 controlled by handle 630a; the cable 630 may be used to pull the locks 620, 622 open and cause bars 614 and 616 to pivot inwardly as shown in FIG. 16, 16A to collapse the bar support frame of the carrier. At the same time the center hinge 615a of body part 604 may be collapsed upwards or downwards as described hereinbefore so that the body part 604 will be collapsed from that shown in FIG. 14 to that shown in FIG. 16.

The carrier 600 includes a position adjustment device in the form of a bar 634 pivotally connected via pivots 635 (on bar 612) and 637 (on bar 612b) to the head part 602, body part 604, and foot part 606 as shown in FIGS. 13 and 15. A strut 613a extends downwardly from bar 612, the strut 613a including pivot pin 614a (as shown in FIG. 13A) which extends through slot 633 in bar 634. Thus, it will be seen that strut 613a and pivot pin 614a provide intermediate pivoting means for the bar 634.

It will now be apparent that pivoting of the head part 602 counter-clockwise causes the head part 602 to go up and at the same time causes the bar 634 to drag the foot part 606 downward, while pivoting the head part 602 in a clockwise direction causes the head part 602 to go down and at the same time causes the bar 634 to pull the foot part 606 upwardly.

The body part 604 will include a semi-circular track 650 having several openings 651 each adapted to receive a knub or pin 652 extending from bar 654 attached to head part 602 as shown. The semi-circular tracks 650 and pins and knubs 652 allow for positioning the head part 602 at any desired angle to the body part 604.

The frame formed by bar supports 609a, 609b, 609c, 610a, 610b, 610c, 614, 616 may be used to support a soft carrier 618 such as fabric, canvas, or soft plastic or even a hard carrier. If desired, the carrier may itself be constructed of rigid materials such as hard plastic, wood or metal such as aluminum.

As seen in FIG. 16, the carrier-frame combination may be folded flat for easy storage.

FIG. 13B shows an embodiment of a carrier 600a similar to that shown in FIG. 13 with the exception that the bar 634a is pivotally connected to bar 609a of the head portion and bar 609c of the foot portion. Thus pivot 614a and strut 613a are not needed although they may be present to pivotally secure a portion of bar 634a to the bar 609b of body portion 604. The bars 634 and/or 634a of FIGS. 13 and 13B may be formed of two telescoping sections or may be otherwise extensible so that the head and foot portions may be positioned and fixed at any desired angle to the body portion.

The carrier 600a of FIG. 13B will function in a manner similar to carrier 600 of FIG. 13.

Turning now to FIGS. 14A and 14B, there is seen a plan view of a cable control-locking mechanism which may be employed in the two-way or three-way carriers described herein.

The frame formed of bars 609a, 609b, 609c and 610a, 610b, 610c along the sides and bars 614, 616 at the ends form an essentially rectangular shaped body as shown defining the head 602, body 604, and foot 606 portions.

Locks 620, 620a, 622 and 622a are disposed about the bar supports 614, 609b, 616 and 610b as shown and are employed to lock the carrier in a desired position and to facilitate collapsing of the carrier as well as to lock the carrier to a separate frame. Cable 630 starting from handle 685 snakes through support bar 610 to bar 614 to lock 620, through bars 610a, 610b to lock 622a, through bars 610c, 616 to lock 622 and through bars 609c, 609b to lock 620a.

It will also be appreciated that the cable may run alongside the aforementioned bar supports and threaded through upwardly extending loops 687 on the bar supports to hook up with the locks or one or more separate cables may be employed to hook up with the locks.

As will now be apparent the cable 630, by manipulation of a handle attached to the cable 630 or by pulling on the cable 630 itself (for example upwardly as shown in FIG. 14A), releases all four locks (or two locks at a time). When the carrier locks are opened, the carrier may be collapsed as described hereinbefore.

FIG. 14B shows the construction of the pivot-locks 620, 620a, 622, 622a with associated hinges or pivots 620b, 620c, 622b, 622c, respectively, the pivot-locks being of the spring retention type and including lock body 690 having disposed therein spring 691 one end of which is connected to cable 630 and the other end of which is connected to latch 692; latch 692 extends through slot 693 in the latch body 690 as shown. Each of the latches 692 of the locks 620, 620a, 622, 622a is adapted to engage corresponding loops or slots 695 on the bar support (or separate frame as will be seen hereinafter) so as to prevent sections of the bar supports from pivoting and collapsing inwardly or outwardly (and for removing the carrier from a separate frame).

The handle 685 (which may be of telescoping design) may also include a pivot or pivot-lock 685a of the spring-retention type as described with respect to FIG. 14B which may be manually operated or connected to cable 630. The handle 685 by means of pivots 685b, 685c may be collapsed inwardly or outwardly.

The spring-retention locks 620, 620a, 622, 622a may be replaced with other conventional locking mechanisms as will be apparent to those skilled in the art.

The afore-described pivot-locks 620, 620a, 622, 622a and cable 630 mechanism or other similar locks may also be used to connect the carrier to a wheeled frame and release the carrier from such wheeled frame.

In fact, as shown in FIG. 14A, the locks 622c and 620c may be employed to lock the carrier to a separate support frame. In such case, as seen in FIG. 14B, the separate support frame 695a will include the recessed area 694 wherein the lock body 690 will be positioned with latch 692 disposed in slot 695 when the carrier is locked to the separate support frame 695a. The carrier may be released from separate support frame 695a by opening the locks via cable 630 which causes the latch 692 to be retracted from slot 695 and the lock body 690 removed from frame recess 694.

Figure 17:
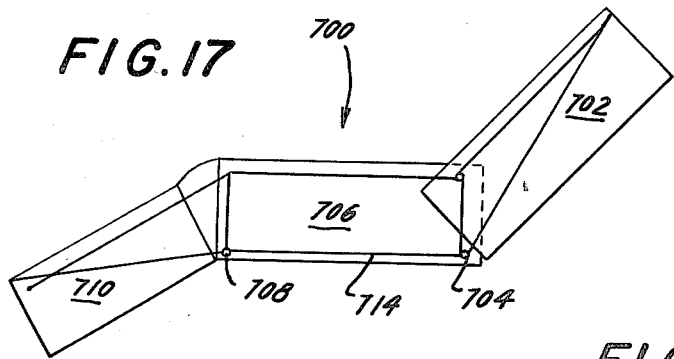
FIG. 17 is a schematic side view of another embodiment of a three-way carrier in accordance with the present invention.
Figure 18:
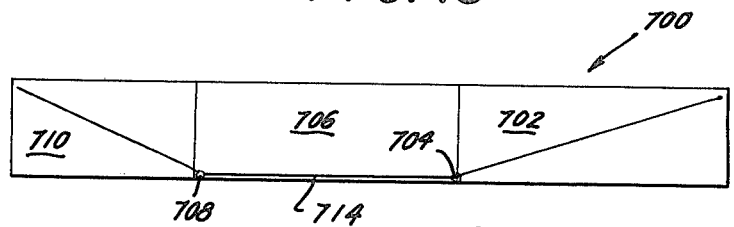
FIG. 18 is a side view of the three-way carrier of FIG. 17 in its collapsed position.

Referring now to FIGS. 17 and 18, another embodiment of a three-way carrier is illustrated indicated generally by the numeral 700 which includes head part 702 pivotally connected via pivot-lock 704 to body part 706 which is pivotally connected via pivot-lock 708 to foot part 710. As seen in FIG. 18, the carrier 700 is equipped with special means in the form of a cable 711 for controlling the movement of head part 702 and foot part 710 as now described. The cable 711 includes three sections, 712, 714 and 716. Cable 712 is employed in conjunction with and retained in head part 702, one end of cable 712 being connected to pivot-lock 704 which preferably takes the form of a conventional spring retention lock. Cable 714 is employed with body part 706 and connects up the spring-retention lock 704 with the pivot-lock 708 which also is preferably in the form of a spring-retention lock. Finally, cable 716 is employed with foot part 716 and is connected to spring-retention lock 708. The cables or cable sections 712, 714, 716 may be in the form of rods which brace and support the head part 702, body part 706, and foot part 710, respectively.

One of the unique features of the three-way carrier 700 is that through the interaction of the cables or rods 712, 714, 716 on the head part, body part and foot part and on the spring-retention locks 704 and 708, movement of the head part can cause corresponding movement of the foot part. Thus, for example, where the head part 702 is moved counter-clockwise as shown in FIG. 17, the cable section 712 acts on the spring-retention lock 704 to open same. Continued upward movement of the head part 702 causes the cables 712 and 714 to tighten which in turn causes spring-retention lock 708 to be opened. As the cables 712 and 714 are tightened with continued upward movement of head part 702, the cable 716 is tightened and with the aid of the spring-retention lock 708 carries and forces foot part 710 downwardly. Thus, in effect, the head part 702 and foot part 710 may be adjusted as a unit so that raising of the head part automatically causes lowering of the foot part, while lowering of the foot part causes raising of the head part. Of course, the reverse action is true so that lowering of the head part will cause a lessening of tension on cable 716 which allows it with the aid of the action of the spring-retention lock 708 to move upwardly back to the position shown in FIG. 18. Furthermore, depending upon the amount of upward movement or downward movement of head part 702, the foot part will be controlled to give a corresponding movement in the opposite direction.

Figure 19:
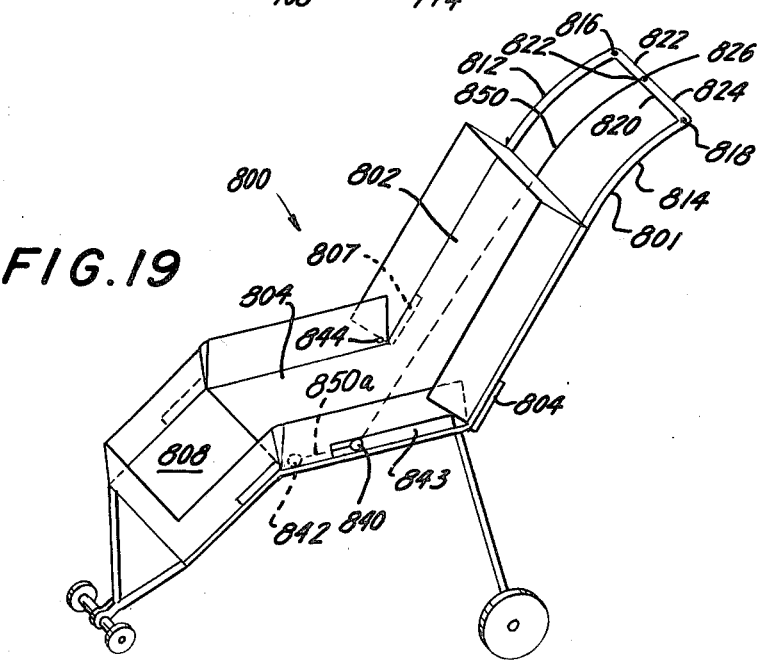
FIG. 19 is a schematic view of another embodiment of a collapsible three-way carrier in accordance with the present invention positioned on a frame to form a stroller.
Figure 20:
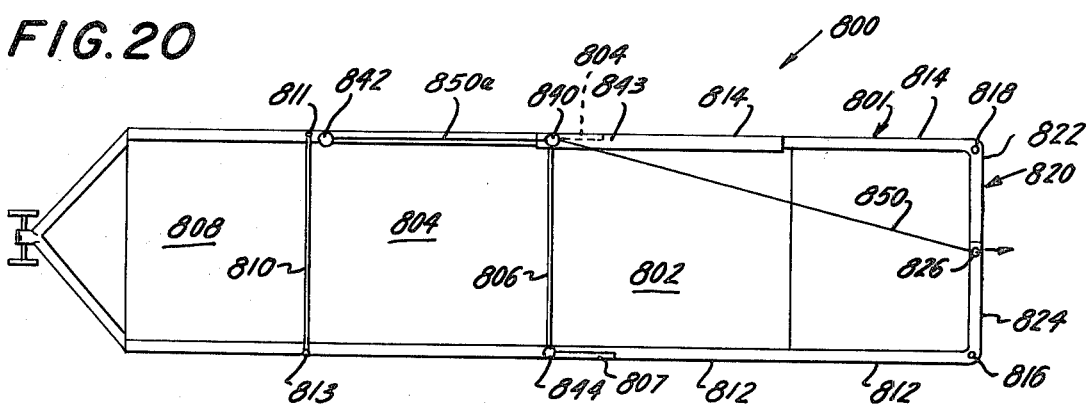
FIG. 20 is a bottom plan view of the three-way carrier shown in FIG. 19.

FIGS. 19 to 23 illustrate a collapsible three-way carrier 800 and associated frame 801. As seen in FIGS. 19, 20 and 20A, the three-way carrier 800 includes head part 802 which is hingedly connected to body part 804 via hinge-lock 806 and body part 804 is hingedly connected to foot part 808 via hinge-lock 810. At one end of hinge 806 is disposed lock-pivot 840; at the other end of hinge 806, the carrier 800 is pivotally connected via pivot 844 to frame 801, as shown.

The frame 801 is of conventional type and includes a pair of spaced apart support members 812, 814 which at one end are pivotally connected via pivots 816, 818, respectively, to cross brace or handle 820. The handle 820 includes two sections 822, 824 pivotally connected to each other by means of pivot 826. The frame includes longitudinal groove 843; a lock 842 is disposed on support member 814 and is connected via a pivot rod 850a to lock-pivot 840 of the carrier 800, lock-pivot 840 being disposed in groove 843 as shown in FIG. 20. In addition, control rod 850 connects the lock-pivot 840 to pivot 826 of the handle 820, as shown.

The carrier and frame includes collapsing means as described herein which enable the collapsing of frame 801 to cause the carrier 800 to collapse within the support members 812, 814 of frame 801. This is accomplished as follows.

The carrier 800 as seen above is provided with means to cause the carrier to rotate within the frame 801 as frame 801 is collapsed. Thus, as control rod 850 is pulled upwardly toward the handle 820, control rod 850 pulls on lock 840 (attached to the carrier 800) to cause it to ride up groove 843 of the frame 801. The lock 840 thereby pulls on rod 850a which, in turn, exerts a pulling force on lock 842 causing lock 842 to open. As the rods 850, 850a continue to exert a pulling force on the carrier 800, the carrier 800 pivots about pivot 844 causing the carrier 800 to turn within frame 801 (as shown in FIG. 22). Continued exertion of the pulling force on carier 800 and the application of inward forces to the sides 812, 814 of frame 801 causes the carrier to turn to the position shown in FIG. 23 while the frame 801 collapses about the carrier. In this manner, the carrier 800 is made to turn 90° within the frame until it assumes the position shown in FIG. 22, that is, in a vertical-like position within the frame. The frame 801 has now collapsed as well so that the support members 812, 814 have moved toward each other and are now only separated by the collapsed carrier itself.

In order to open the frame and carrier, the above described procedure is simply reversed so that by pulling outwardly on the sides 812 and 814 of frame 801 and releasing control rod 850 and pushing in on same, the handle sections 822, 824 force the frame support members 812, 814 apart and at the same time cause control rod 850 to move the locks 840, 842 to the position shown in FIG. 20 thereby forcing the carrier to pivot on pivot 844 and turn 90° back to its original open working position as shown in FIG. 19. At the same time, the hinge 810 may be moved downwardly away from the head part 802 to the normal seat position. When this position is attained, the locks 840, 842 (which may be of the sring-retention type or otherwise as described hereinbefore) are automatically closed thereby locking the carrier 800 in place on the frame 801.

Figure 24:
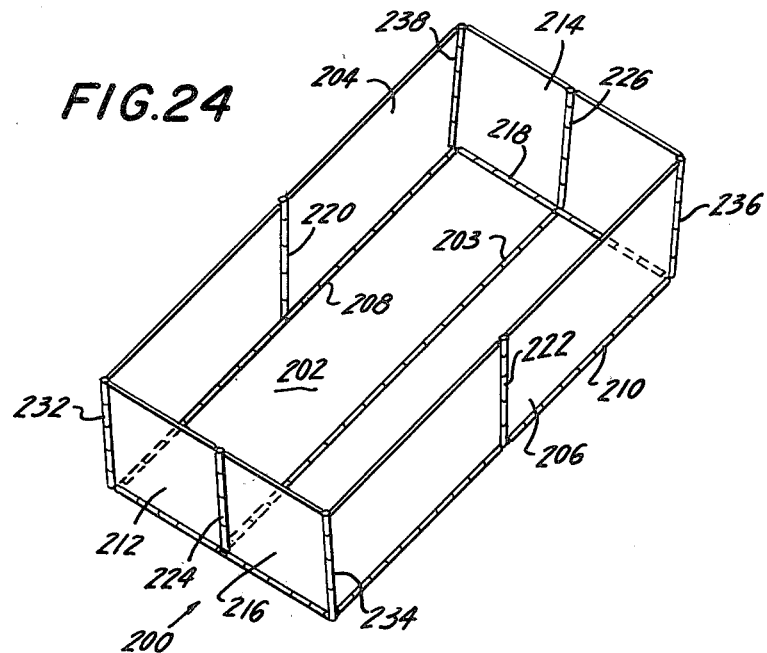
FIG. 24 is a schematic perspective view of another embodiment of a baby carrier in accordance with the present invention.
Figure 25:
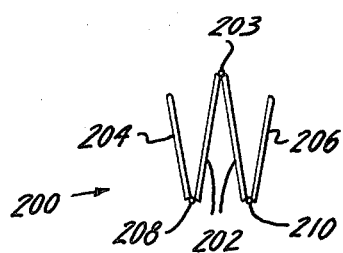
FIG. 25 is an end view of the carrier of FIG. 24 in a partially collapsed position wherein the bottom portion thereof is collapsed upwardly.
Figure 26:
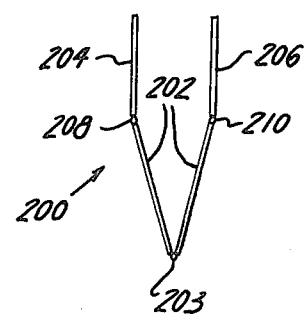
FIG. 26 is an end view of the carrier of FIG. 24 wherein the bottom portion thereof is collapsed downwardly.
Figure 27:
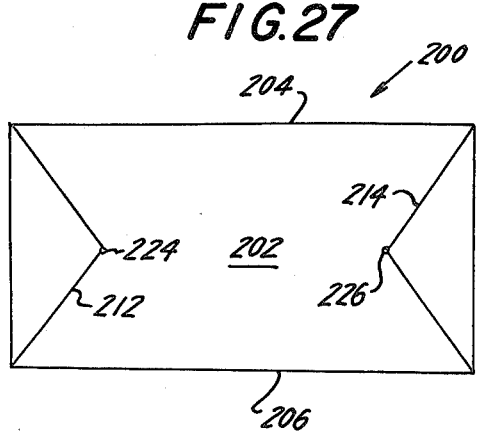
FIGS. 27 to 34 are schematic representations of the carrier of FIG. 24 collapsed in various ways.
Figure 28:
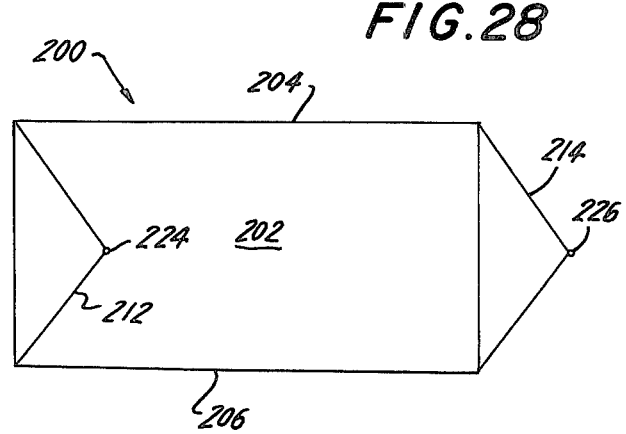
Figure 29:
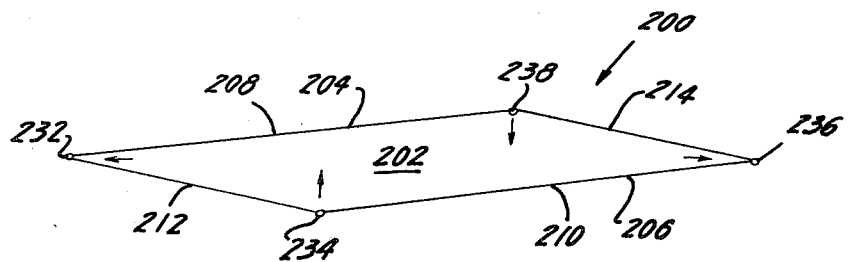
Figure 30:
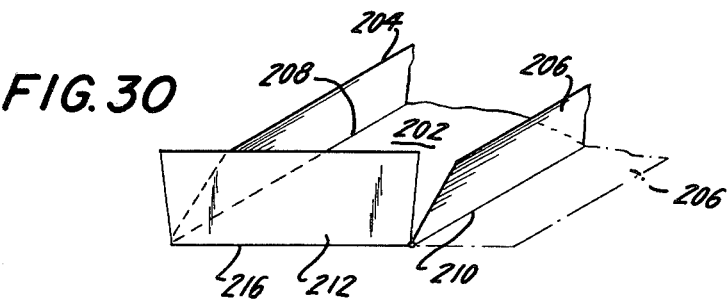
Figure 31:
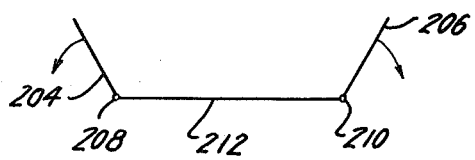
Figure 32:
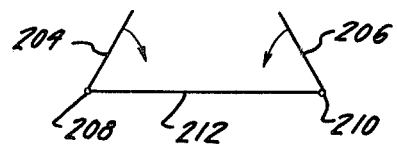
Figure 33:
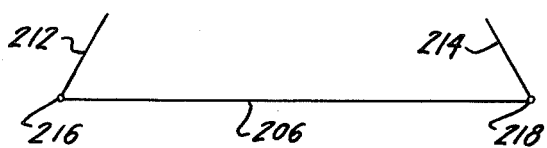
Figure 34:
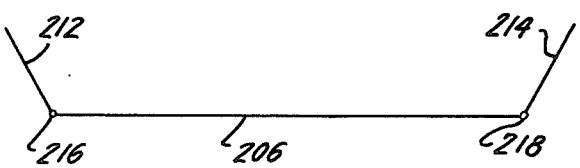

Turning now to FIGS. 24 to 34, there is shown another embodiment of a collapsible baby carrier in accordance with the invention identified by the numeral 200. The baby carrier as shown in FIG. 24 includes a bottom wall 202, having center hinge 203, two side walls 204, 206, each hingedly connected to the bottom wall 202 via hinges 208, 210, respectively, and one or two end walls 212, 214 hingedly connected to the bottom wall via hinges 216, 218, respectively. The side walls may or may not be hingedly connected to the end walls. Furthermore, each of the side walls 204, 206 and end walls 212, 214 may include an intermediately disposed hinge 220, 222, 224, 226 respectively, as shown. Thus, as shown in FIGS. 25 and 26 to collapse the carrier and fold it flat the bottom wall may be collapsed by folding the center hinge 203 up or down, respectively. Furthermore, the end walls can be folded inwardly toward each other about hinges 224, 226 as shown in FIG. 27 or outwardly away from each other, or in the same direction about hinges 224, 226 as shown in FIG. 28 and may be collapsed about hinges 216, 218 on top of or below the bottom wall as shown in FIGS. 33 and 34. Also as shown in FIGS. 31 and 32, the side walls 204, 206 may be folded away from each other about hinges 208, 210, respectively, or folded towards each other about hinges 208, 210. In addition, the bottom wall 202 may be rotated upwardly or downwardly about an end hinge 216 or 218 or about a side hinge 208, 210. In all the above cases, where applicable, the end walls and side walls may be disconnected from each other as shown in FIG. 30. As shown in FIG. 29, the carrier may also be collapsed by pivoting the bottom wall at one side hinge 208 or 210, or end hinge 216 or 218 upwardly and then moving corner optional hinges 230, 232, 234, 236 toward each other.

Thus, in summary, the carrier 200 can be hinged anywhere to fold up or down, in center, on either side or either end. The ends or sides may hinge anywhere and fold in or out from center or sides or any position in between. Furthermore, the bottom may be completely removed or pivoted away and the hinges on the four vertical end corners allow the sides and end of the carrier to be folded lengthwise.

Turning now to FIGS. 35 to 43 there are shown improvements over the two-piece telescoping baby carriers disclosed in U.S. Pat. No. 3,961,803, U.S. Pat. No. 3,971,079, and U.S. Pat. No. 3,967,833.

A first embodiment of the improved two-piece telescoping baby carrier 300 is shown in FIGS. 35 to 39 which includes head section 312 (shown in FIG. 35) adapted to be employed in the telescoping relationship with the foot section 322 (shown in FIG. 36) via the rails 324, 326 of foot section 322 being slidably engaged in the tracks 328, 330 of head section 312. The carrier 300 includes a unique hinge arrangement shown in FIG. 35 for the head end panel 310 of the head section 312 of the 2-piece telescoping carrier. The end panel 310 is secured to the side panels 314 and 316 near the upper portions thereof via the pin and slot arrangements 318, 320 as shown in FIG. 35. In addition, as shown in FIG. 36, the foot section 322 of the 2-piece carrier is adapted via rails 324, 326 to fit in the tracks 328, 330 of the head section. The foot end panel 332 is hinged near the upper portions thereof to side panels 334, 336.

The bottom portions 210a, 232a of the head end panel 210 and foot end panel 332, respectively, are free to move or swing up and away from the bottom walls 338, 340, respectively. However, the end panel 310 may be held in place during use by a "T" shown in FIG. 41 which rides in a track or slot 372 in the bottom wall 338 of the head section 312 and engages one or more loops 374 or hooks connected to the bottom of end panel 310. A similar arrangement may be employed to secure the end panel 332 to bottom wall 340 of foot section 332. Other conventional type fastening devices may be employed to detachably secure the end panels to the bottom walls of the head and foot sections. Furthermore, where a T-bar arrangement is used, the T-bar may be connected to the end panels and the hooks or grooves may be connected to the bottom walls.

A hinge flap 350 is also provided which covers end hinge 352 and keeps the end panel 310 in an open sturdy position so as to support the head of a baby and prevents the end panel from buckling outwardly. When it is desired to collapse the head end panel 310, the hinge flap may be moved from the position shown in FIGS. 35 and 38 to that shown in FIG. 39.

Alternatively, as seen in FIG. 40, the abutting edges A, B of the sections of the end panel may be employed to prevent undesired buckling of the sections of the end panel; the bottom wall of the carrier may also be prevented from buckling by the abutting edges of the bottom wall sections.

The above carrier requires no locks or fasteners and will remain open as long as the weight of an infant is on the bottom wall. The carrier may fold up by exerting pressure on the sides thereof.

Figure 42:
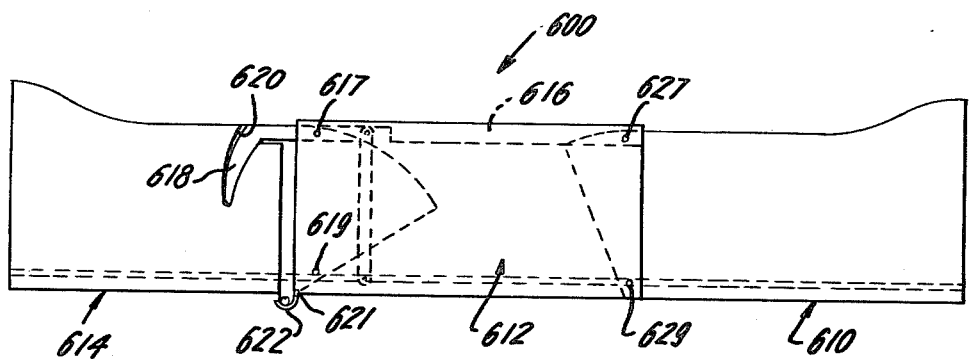
FIG. 42 is a view of another embodiment of a two piece carrier in accordance with the present invention.
Figure 42A:
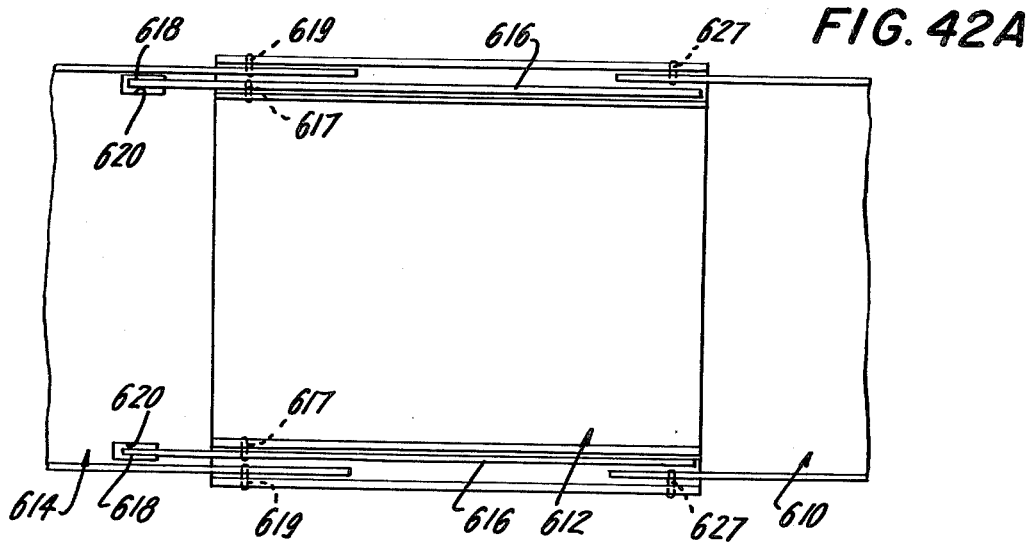
FIG. 42A is a plan view of the carrier shown in FIG. 42.
Figure 43:
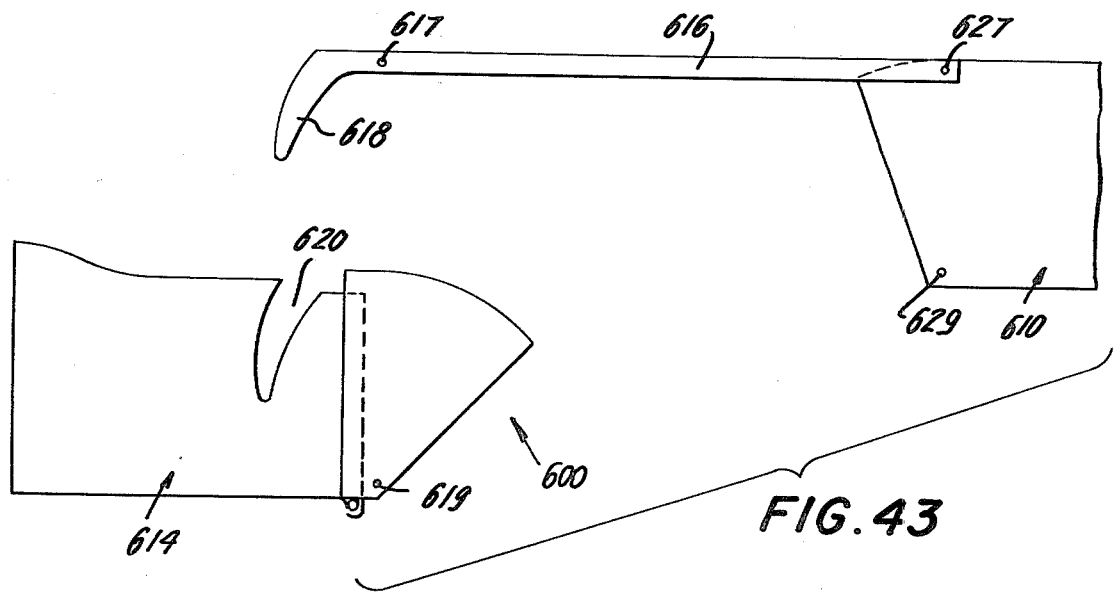
FIG. 43 is a view of the carrier of FIG. 42 wherein the head and leg portions are disconnected.

Referring now to FIGS. 42, 42A and 43 there is shown another embodiment of a three-way carrier 600 similar to that described above with respect to FIGS. 7 to 12 and 13 to 20 in that it includes head part 610, body part 612 and foot part 614, all of which may be connected together as shown. The head and body parts include a pair of extension arms 616 each pivotally connected via pivot 627 to head portion 610 each terminating in a hooked portion 618. Each of the hooked portions 618 is adapted to engage the open wedged portions 620 of the foot part 614 and thereby connect up the body and foot parts to each other. At the bottom end 621 of body part 612 a catch or bar type lock 622 is disposed which connects the bottom of the foot part 614 to the bottom of the body part 612. The body portion 612 is pivotally connected via pivots 617, 619, 623, 625 (only pivots 617, 619 being shown) to foot portion 614 and body portion 612 is pivotally connected via pivots 627, 629, 631, 633 (only pivots 627, 629 being shown) to head portion 610 as shown to provide three way action and movement of the head, body and foot portions as described with respect to FIGS. 7 to 20.

The end of the hooked portion 618 may be used as a carrying handle. A bar 628 is secured to the body part 612 (shown only in FIG. 42) and to each of the extension arms 616 and functions to support the extension arms 616. Flaps 640 are provided on foot portion 614 and flaps 642 are provided on head portion 610 to insure an air tight engagement with body section 612.

Where the head and body parts have been disconnected from the foot part, the head and body parts may be used as a carrier or seat by itself, as well as a car bed, car seat, infant bed, infant carrier, infant seat.

The carrier as shown in FIGS. 42 and 43 includes a hinge arrangement similar to that shown in FIGS. 35 to 41 and thus may be easily collapsed for storage. It will also be appreciated that only one extension arm-lock arrangement 616, 618 may be employed, if desired.

It will be appreciated that the foot section or foot rest may remain with and be folded or collapsed within a frame and only the head and body section, now forming a two-way carrier, removed from the frame. In such case, the head and body sections forming the detached carrier may be used as an infant seat, car seat, or carrier portion of a stroller or swing set or high chair or youth chair. When the foot section is removed from the frame together with the head and body sections and remains attached to the head and body sections, such three-way carrier (detached from its original support frame) may be used as a car seat, or car bed and in conjunction with any other frames may be employed as a carriage, stroller, swing set, cradle, high chair, youth chair and the like.

Referring now to FIGS. 44 to 50 there is shown a semi-circular or arc-like track arrangement employed to facilitate the connecting of baby carriers on frames of the types disclosed in the three (3) above-mentioned U.S. patents as well as the connecting of other types of carriers on other types of frames including general folding frames, carts, conveyances, etc., and adjusting the carriers to any desired position on the frames and removing the carriers therefrom.

The track arrangement 400, as shown, is permanently or removably connected to either or both sides of the carrier 402 and includes a curved member 404 which may include various connecting positions along its entire length so that the carrier 402 can be connected at any desired position and/or at any desired angle of inclination along a frame 406.

In a preferred embodiment, as seen in FIGS. 49 and 50, each track arrangement 400 may comprise two spaced apart parallel tracks 408, 410 which can be compressed to fix the tracks on the frame 406 and carrier 402 so that the carrier 402 is rigidly positioned on the frame 406. The tracks 408, 410 may also be pulled apart to allow sliding of the carrier 402 along the tracks 408, 410. In such embodiment, the carrier 402 will include pins 412 which are disposed in the slot 414 formed between the tracks 408 and 410 so that the pins 412 will ride along slot 414 as the carrier 402 is moved along the track arrangement 408, 410. The carrier 402 is adapted to be removed from or slide off the tracks 408, 410 at either end of the tracks or at any position intermediate the ends. The frame will also include a set of pins 416 which engage the slot 414 of the track arrangement 408, 410 so that the frame 406 can be rigidly but removably connected to the track arrangement.

The two tracks 408 and 410 of the track arrangement may be spread apart into the unlocking position or moved toward each other into the locking position using any conventional means. In one embodiment, a spring tension hook device with an optional cable release can be used to compress or pull apart the tracks 408 and 410. As shown in FIGS. 49 and 50, the spring tension device may comprise a pair of hinged compression spring members 420 and 422 which are connected to a slide bar 424. The slide bar 424 may be moved up or down causing the hinged compression spring members 420 and 422 to collapse thereby causing the tracks 408 and 410 to move toward each other (FIG. 49) and compress to lock the tracks about the pins 412 of the carrier and pins 416 of the frame. By moving the slide bar in the opposite direction, the hinged compression spring members are moved to the position shown in FIG. 50 so that the tracks 408 and 410 are pulled apart and spaced sufficiently from each other to define the slot 414. A remotely controlled cable connected to the slide bar can be used to work the slide bar to compress or pull apart the tracks 408 and 410.

In summary, the semi-circular or arc-like track arrangement of FIGS. 44 to 50 permits movement of the carrier 402 from horizontal to vertical positions and positions intermediate thereof with the least motion and the most mechanical ease and simplicity while the tracks 408, 410 fit into the frame 406 with excellent symmetry. The semi-circular track arrangement described above may be employed with any of the two-way and three-way carriers described herein as well as with any of the frames described herein.

Referring now to FIG. 50A there is shown an alternate semi-circular track arrangement employed in conjunction with carrier 402. In FIG. 50A one or more rotating members 404a such as wheels are rotatably mounted to the sides of carrier 402; the curved member 404 is designed so as to define a track adapted to receive the wheels 404a. The carrier 402 via wheels 404a may thus engage curved member 404 and may slide along curved member 404 to the various positions as shown in FIGS. 47 and 48. Furthermore, the carrier 402 may be easily removed from curved member 404 by merely slipping the curved member 404 from the wheels 404a.

It will be appreciated that any conventional means may be used to position the carrier with respect to the curved member 404.

Turning now to FIGS. 51 to 57 there is illustrated a series of swing systems which may make use of various carriers as disclosed in the three (3) afore-mentioned U.S. patents, as well as the various two-way, three-way and telescoping carriers disclosed herein or any other type carrier, chair, crib, conveyance, etc.

Figure 51:
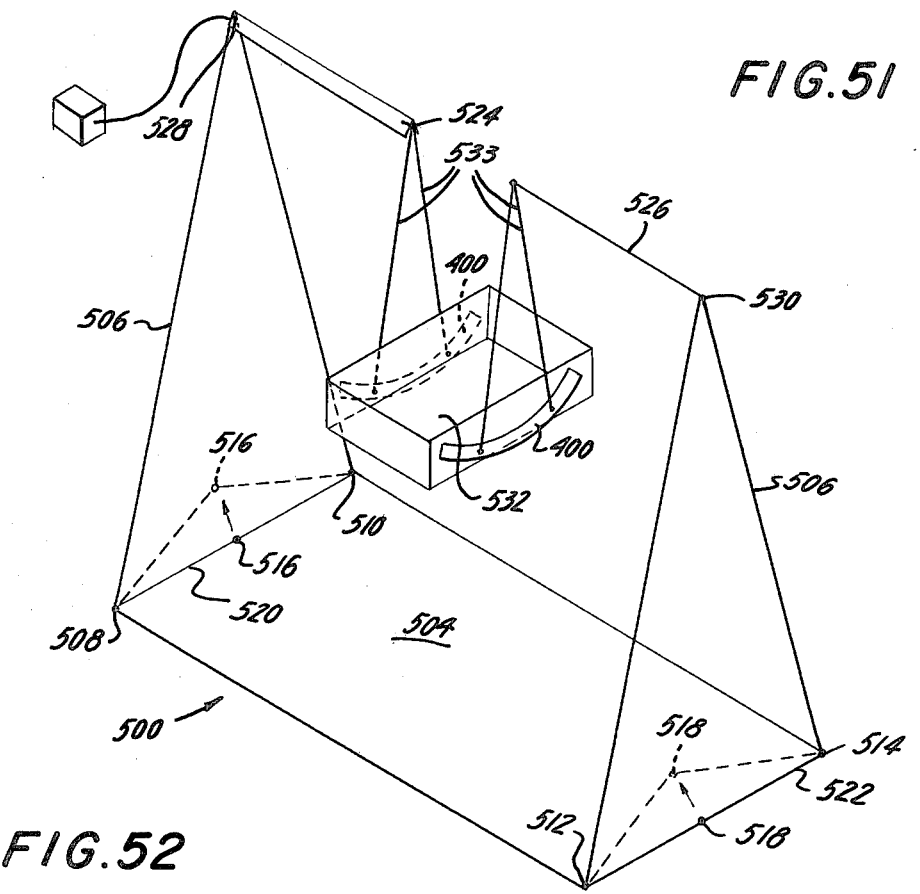
FIG. 51 is a schematic view of a swing arrangement employing the semi-circular track arrangement of the invention.
Figure 52:
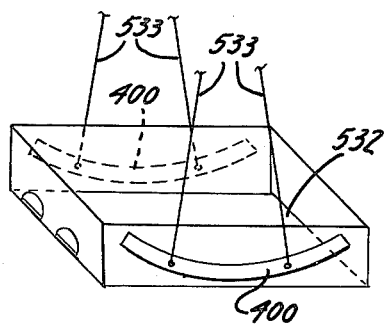
FIG. 52 is a schematic view of the child carrier portion of the swing arrangement of FIG. 51 suspended in a position 90° to that shown in FIG. 51.
Figure 53:
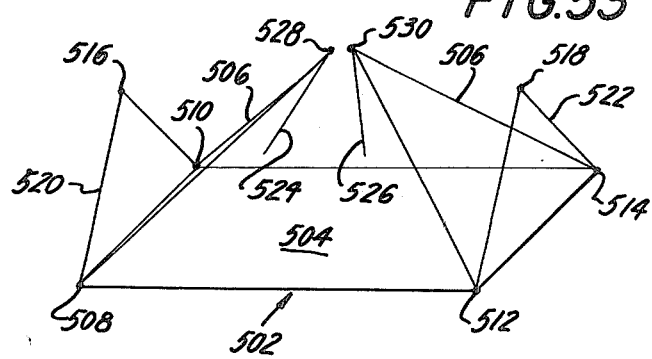
FIG. 53 is a schematic view of the swing frame shown in FIG. 51 in a partially collapsed state.

In one embodiment as shown in FIGS. 51 to 53, swing system 500 includes a unique collapsible or foldable frame or support system 502 which includes a substantially rectangular bottom portion 504 with triangular side portions 506 hingedly connected to corners 508, 510, 512 and 514 of the bottom portion 504, as shown in FIG. 51. Hinges 516 and 518 are provided intermediate the ends 520 and 522 of the bottom portion 504 so that in collapsing the frame, as shown in FIG. 53, the ends 520 and 522 of the bottom portion 504 can be collapsed by pulling upwardly on the hinges 516 and 518 to the position shown by the broken lines in FIG. 51. Thereafter, the triangular side portions 506 can be pivoted toward each other as shown in FIG. 53 to collapse or fold the frame.

As shown in FIG. 51, a pair of support members 524 and 526 hingedly connected via pivots 528, 530, respectively, to each of the portions 506 as shown support a carrier 532 of any of the types described above. The carrier 532 is supported via chains or ropes 533 by a track arrangement 400 as shown in FIGS. 44 to 50 described above or other type of connecting member so that the carrier may be supported at any angle or position as shown in FIG. 51 (as a cradle), FIG. 52 (sideways), or even FIG. 54 (as a normal type swing).

Figure 54:
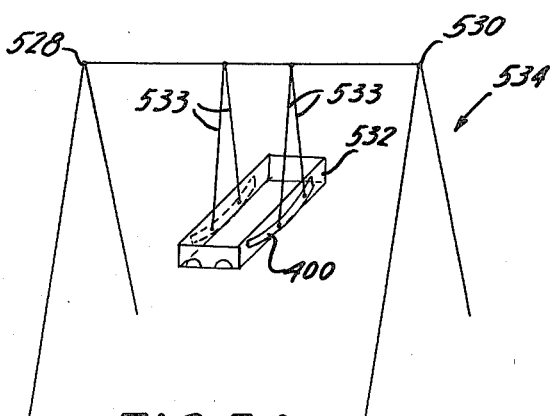
FIGS. 54 and 55 are schematic views of alternate embodiments of swing arrangements employing the semi-circular track arrangement in accordance with the present invention.
Figure 55:
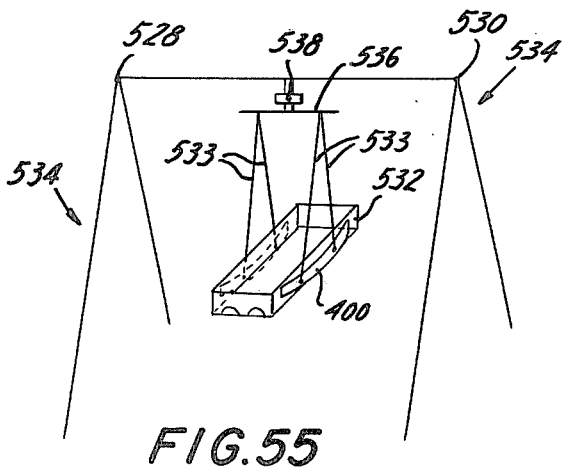

As seen in FIGS. 54 and 55, the carrier 532 including track arrangement 400 may be secured to a conventional type swing support frame 534 as well. As shown in FIG. 55, the carrier 532 may be connected to a cross support 536 which is connected by means of a conventional adjustable swivel 538 to the top support of conventional swing frame 534 or other type frame. Thus, the position of the carrier 532 may be fixed via swivel 538 and thus may be swung front to rear as in the case of a conventional swing or swiveled 90° about swivel 538 and rocked side to side as a cradle. Furthermore, the position of the carrier 532 may be varied via track arrangement 400 (as described) hereinbefore (with respect to FIGS. 44 to 50) between a cradle position and normal sitting position.

Figure 56:
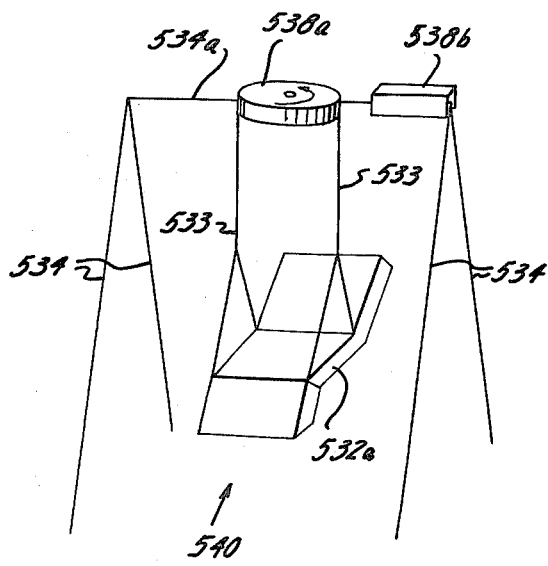
FIGS. 56 and 57 are schematic views of alternate embodiments of swing arrangements employing the three-way carrier of the invention with or without the semi-circular track arrangement of the invention.
Figure 57:
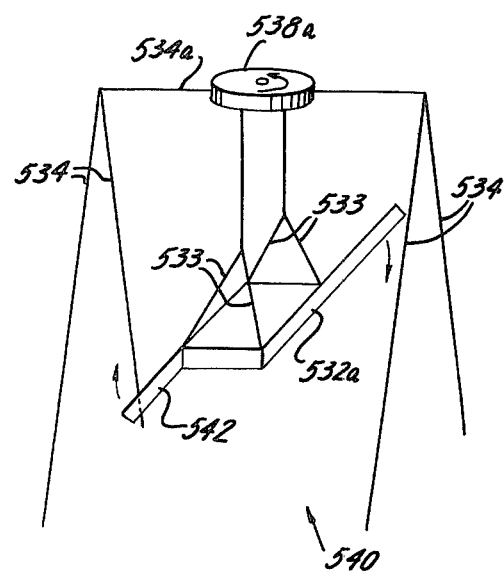

Turning now to FIGS. 56 and 57, there is shown a swing arrangement 540 including therein swing frame support 534 and carrier 532a in the form of a three-way carrier as described hereinbefore. The three-way carrier 532a is connected via chains or ropes 533 to swivel mechanism 538a secured to cross brace 534a. The swivel mechanism may comprise any conventional manually operated (such as by a spring) or automatically powered rotating member 538b which may be powered by battery, chemical means or other electrical means to rotate 360° in a plane parallel to the ground or horizontal. In this manner, the swing may be automatically adjusted to provide swinging motion, swaying motion or rocking motion depending upon the disposition of the three-way carrier 532a itself. Thus, the carrier 532a itself may be adjusted flat as a cradle or bed, or as a seat (as shown in FIGS. 56 and 57) and may be positioned via the swivel or turning mechanism 538a, 538b as a conventional swing as shown in FIG. 56, 90° thereto as shown in FIG. 57 to provide rocking motion or swaying motion.

It will also be appreciated that the three-way carrier may be employed without the foot portion 542, with any type frame and support system and with or without the track arrangement 400.

In summary, the frame and carrier may be folded flat for easy movement and storage. The carrier may be mounted in a horizontal sideways position so that it can be rocked as a cradle or can be mounted in any inclined position from vertical to even horizontal position and positions therebetween and swing front to rear, back and forth (or sideways so as to rock as a bed or cradle). Use of a semi-circular or arc-like track arrangement 400 permits suspension of the carrier in any desired position from vertical to horizontal or inbetween.

What is claimed is:

1. A seat for infants comprising, in combination, a seat portion including a front end and a rear end and a pair of side portions connecting said front and rear ends, a back rest portion including an upper end and a lower end and a pair of side portions connecting said upper and lower end portions, a pair of coaxial and transversely disposed hinges, each hinge having one of its ends running from a said side portion and its other end terminating substantially midway the width of said seat and back rest portions and hingedly connected along peripheral portions of the rear end of said seat portion and the lower end of said back rest portion thereby directly connecting said seat and back rest portions to each other, and a first longitudinally disposed hinge disposed intermediate and substantially midway between said sides of and running the length of the seat portion thereby dividing the seat portion into two substantially rigid one-piece longitudinal sections, and a second longitudinally disposed hinge disposed intermediate the sides of and running the length of the back rest portion, thereby dividing the back rest portion into two substantially rigid one-piece longitudinal sections, said seat portion and said back rest portion being adapted to support an infant without buckling and without bowing, whereby said seat may be collapsed by moving said seat portion about said transversely disposed hinge in close proximity to said back rest portion, moving one of said longitudinal sections about said longitudinally disposed hinge into close proximity to the other of said longitudinal sections.

2. The seat as defined in claim 1 further including support means for further connecting said seat portion to said back rest portion.

3. The seat as defined in claim 2 wherein said support means comprises at least one adjustable strap for supporting the back rest portion at a desired angle to the seat portion.

4. The seat as defined in claim 3 wherein said support means comprises a pair of adjustable straps, each strap being disposed in close proximity to an end of a said transversely disposed hinge.

5. The seat as defined in claim 2 wherein said support means comprises a pair of adjustable straps, each strap being connected at one end to said upper end portion of the back rest portion and to said front end portion of the seat portion, said adjustable straps supporting the seat portion at a desired angle to the back rest portion.

6. The seat as defined in claim 1 further including back brace means pivotally connected to the back rest portion and extending to the rear thereof for supporting said back rest portion at a desired angle to the horizontal.

7. The seat as defined in claim 6 wherein said back brace means comprises a pair of legs one end of each being pivotally connected to said back rest portion.

8. The seat as defined in claim 2 further including leg support means for connecting an intermediate portion of each leg to an intermediate side portion of the back rest portion, and locking-clamping means disposed on said back rest portion for locking said legs against said back rest portion when said legs are not in use.

9. The seat as defined in claim 6 further including back brace support means for connecting intermediate portions of said back brace means to an intermediate portion of said back rest portion.

10. The seat as defined in claim 6 further including locking-clamping means disposed on said back rest portion for locking said back brace means against said back rest portion when said back brace means are not in use.

11. The seat as defined in claim 6 further including support means for supporting said seat portion with respect to said back rest portion.

12. The seat as defined in claim 11, wherein said support means comprises at least one adjustable strap.

13. The seat as defined in claim 1 further including carrying or gripping means associated with said back rest portion for facilitating carrying of said seat.

14. The seat as defined in claim 13 wherein said gripping means comprises cutout areas disposed near the upper end of said back rest portion.

15. The seat as defined in claim 13 wherein said carrying means comprises adjustable strap means connected near the upper end of said back rest portion.

16. The carrier as defined in claim 1 formed of a rigid material.

17. The seat as defined in claim 1 further including gripping means associated with said seat portion for facilitating carrying of said seat.

18. The seat as defined in claim 17 wherein said gripping means comprises cutout areas disposed near the front end of said seat portion.

* * * * *